US011105932B2

(12) United States Patent
Khalajmehrabadi et al.

(10) Patent No.: US 11,105,932 B2
(45) Date of Patent: Aug. 31, 2021

(54) METHOD AND SYSTEM FOR DETECTING AND MITIGATING TIME SYNCHRONIZATION ATTACKS OF GLOBAL POSITIONING SYSTEM (GPS) RECEIVERS

(71) Applicants: Ali Khalajmehrabadi, San Antonio, TX (US); Nikolaos Gatsis, San Antonio, TX (US); David Akopian, San Antonio, TX (US); Ahmad Fayez Taha, San Antonio, TX (US)

(72) Inventors: Ali Khalajmehrabadi, San Antonio, TX (US); Nikolaos Gatsis, San Antonio, TX (US); David Akopian, San Antonio, TX (US); Ahmad Fayez Taha, San Antonio, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 0 days.

(21) Appl. No.: 16/227,744

(22) Filed: Dec. 20, 2018

(65) Prior Publication Data
US 2019/0187294 A1 Jun. 20, 2019

Related U.S. Application Data

(60) Provisional application No. 62/608,396, filed on Dec. 20, 2017.

(51) Int. Cl.
*G01S 19/21* (2010.01)
*G01S 19/25* (2010.01)
*G01S 19/00* (2010.01)

(52) U.S. Cl.
CPC ......... *G01S 19/215* (2013.01); *G01S 19/256* (2013.01)

(58) Field of Classification Search
CPC .............................. G01S 19/215; G01S 19/256
See application file for complete search history.

(56) References Cited

U.S. PATENT DOCUMENTS 5,557,284 A 9/1996 Hailman
7,764,224 B1 7/2010 Anderson
(Continued)

FOREIGN PATENT DOCUMENTS

GB 2483713 A * 3/2012 ........... G01S 19/215

OTHER PUBLICATIONS

A. Jafarnia-Jahromi et al, "Detection and Mitigation of Spoofing Attacks on a Vector-Based Tracking GPS Receiver"; paper presented at ION ITM 2012; Newport Beach, California, USA; Feb. 1, 2012. (Year: 2012).*

(Continued)

*Primary Examiner* — Bernarr E Gregory
(74) *Attorney, Agent, or Firm* — Thomas Horstemeyer, LLP

(57) ABSTRACT

A system and method are provided for detecting and estimating time synchronization attacks (TSAs) on Global Positioning System (GPS) receivers. The system and method can be implemented to address gaps in the known or proposed TSA detection solutions. In particular, the system and method can be implemented to provide a TSA countermeasure solution that: 1) provides a comprehensive countermeasure against different types of TSAs; 2) allows the GPS receiver to continue its normal operation, which is especially beneficial in Phasor Measurement Unit (PMU) applications where the network's normal operation cannot be interrupted; in other words, the solution not only detects TSAs, but also mitigates their effects so that the network can continue its normal operation; and 3) is relatively simple and capable of (Continued)

being integrated with current GPS receivers without having to alter the circuitry of the GSP receivers.

26 Claims, 12 Drawing Sheets

(56) References Cited

U.S. PATENT DOCUMENTS

| | | | | |
|---|---|---|---|---|
| 8,607,351 | B1* | 12/2013 | Wang | G06F 21/577 |
| | | | | 726/25 |
| 10,495,759 | B2* | 12/2019 | Leibner | H04K 3/90 |
| 2013/0002477 | A1 | 1/2013 | Dehnie | |
| 2014/0035783 | A1 | 2/2014 | Contarino | |
| 2016/0223677 | A1* | 8/2016 | Trevino | G01S 19/215 |

OTHER PUBLICATIONS

Z. Zhang et al, "Combating Time Synchronization Attack: A Cross Layer Defense Mechanism"; from the proceedings of ICCPS '13; Philadelphia, PA, USA;; Apr. 8-11, 2013; pp. 141-149. (Year: 2013).*
Y. Fan et al., "A Cross-Layer Defense Mechanism Against GPS Spoofing Attacks on PMUs in Smart Grids"; published in "IEEE Transactions on Smart Grid"; vol. 6, No. 6; Nov. 2015; pp. 2659-2668; published by IEEE, Piscataway, NJ, USA. (Year: 2015).*
Ali Khalajmehrabadi et al. "Real-Time Rejection and Mitigation of Time Synchronization Attacks on the Global Positioning System", IEEE Trans, on Ind. Elec., vol. 65, No. 8, Aug. 2018,pp. 6425-6435.
I. Yaesh and U. Shaked, "Neuro-adaptive Hao estimation and its application to improved tracking in GPS receivers," EEE Trans. Ind. Electron., vol. 56, No. 3, pp. 642-647, Mar. 2009.
X. Li and Q. Xu, "A reliable fusion positioning strategy for land vehicles in GPS-denied environments based on low-cosl sensors," IEEE Trans. Ind. Electron., vol. 64, No. 4, pp. 3205-3215, Apr. 2017.
D. Schmidt, K. Radke, S. Camtepe, E. Foo, and M. Ren, "A survey and analysis of the GNSS spoofing threat and countermeasures," ACM Comput. Survey, vol. 48, No. 4, p. 64:1-64:31, May 2016.
B. Moussa, M. Debbabi, and C. Assi, "Security assessment of time synchronization mechanisms for the smart grid," EEE Commun. Surveys Tuts., vol. 18, No. 3, pp. 1952-1973, Third Quarter 2016.
D. P. Shepard, T. E. Humphreys, and A. A. Fansler, "Evaluation of the vulnerability of phasor measurement units to GPS spoofing attacks," Int. J. Crit. Infrastruct. Protect., vol. 5, pp. 146-153, Dec. 2012.
Z. Zhang, S. Gong, A. D. Dimitrovski, and H. Li, "Time synchronization attack in smart grid: Impact and analysis," IEEE Frans. Smart Grid,vol. 4, No. 1, pp. 87-98, Mar. 2013.
X. Jiang, J. Zhang, B. J. Harding, J. J. Makela, and A. D. Dominguez-Garcia, "Spoofing GPS receiver clock offset of phasor measurement units," IEEE Trans. Power Syst., vol. 28, No. 3, pp. 3253-3262, Aug. 2013.
P. Risbud, N. Gatsis, and A. Taha, "Assessing Power System State Estimation Accuracy with GPS-Spoofed PMU Measurments", IEEE Trans. Smart Grid, 2016.
T. Nighswander, B. Ledvina, J. Diamond, R. Brumley, and D. Brumley, "GPS software attacks," in Proc. ACM Conf. Comput Commun. Security, Oct. 2012, pp. 450-461.
N. O. Tippenhauer, C. P'opper, K. B. Rasmussen, and S. 'Capkun, "On the requirements for successful GPS spoofing attacks," in Proc. 18th ACM Conf. Comput. Commun. Security, Oct. 2011, pp. 75-86.
M. L. Psiaki and T. E. Humphreys, "GNSS spoofing and detection," Proc. IEEE, vol. 104, No. 6, pp. 1258-1270, Jun. 2016.
P. Papadimitratos and A. Jovanovic, "GNSS-based positioning: Attacks and countermeasures," in Proc. Military Commun. Conf., San Diego, CA, USA, Nov. 2008, pp. 1-7.
Q. Zeng, H. Li, and L. Qian, "GPS spoofing attack on time synchronization in wireless networks and detection scheme design," in IEEE Military Commun. Conf., Oct. 2012, pp. 1-5.

Y. Fan, Z. Zhang, M. Trinkle, A. D. Dimitrovski, J. B. Song, and H. Li, "A cross-layer defense mechanism against GPS spoofing attacks on PMUs in smart grids," IEEE Trans. Smart Grid, vol. 6, No. 6, pp. 2659-2668, Nov. 2015.
A. Ranganathan, H. Olafsd ottir, and S. Capkun, "SPREE: A spoofing resistant GPS receiver," in Proc. 22nd Annu. Int. Conf. Mobile Comput. Netw., 2016, pp. 348-360.
D. Chou, L. Heng, and G. X. Gao, "Robust GPS-based timing for phasor measurement units: A position-information-aided approach," in Proc. 27th Int. Tech. Meeting Satellite Division Inst. Navig., Sep. 2014, pp. 1261-1269.
Y. Ng and G. X. Gao, "Advanced multi-receiver position-information-aided vector tracking for robust GPS time transfer to PMUs," in Proc. 28th Int. Tech. Meeting Satellite Division Inst. Navig., Sep. 2015, pp. 3443-3448.
D.-Y. Yu, A. Ranganathan, T. Locher, S. 'Capkun, and D. Basin, "Short paper: Detection of GPS spoofing attacks in power grids," in Proc. ACM Conf. Security Privacy Wireless Mobile Netw., 2014, pp. 99-104.
K. Jansen, N. O. Tippenhauer, and C. Popper, "Multi-receiver GPS spoofing detection: Error models and realization," n Proc. 32nd Annu. Conf. Comput. Security AppL, 2016, pp. 237-250.
S. Han, D. Luo, W. Meng, and C. Li, "A novel anti-spoofing method based on particle filter for GNSS," in Proc. IEEE Int. Conf. Commun., Jun. 2014, pp. 5413-5418.
F. Zhu "Detection techniques for data-level spoofing in GPS-based phasor measurement units," A Thesis in The Department of Engineering and Computer Science; Concordia University, Montreal, Quebec, Canada, Nov. 2016, pp. 1-70.
O. P. Shepard, "Characterization of receiver response to a spoofing attacks," Thesis presented to the Faculty of the Undergraduate School of the University of Texas at Austin in Partial Fulfillment of the Requirements for the Degree of Bachelor of Science in Aerospace Engineering, The University of Texas at Austin, May 2011, pp. 1-36.
T. E. Humphreys, B. M. Ledvina, M. L. Psiaki, B. W. O'Hanlon, and P. M. Kintner, "Assessing the spoofing threat Development of a portable GPS civilian spoofer," in Proc. 21st Int. Tech. Meeting Satellite Division Inst. Navig., Savannah, GA, USA, Sep. 2008, pp. 2314-2325.
L. Heng, J. J. Makela, A. D. Dominguez-Garcia, R. B. Bobba, W. H. Sanders, and G. X. Gao, "Reliable GPS-based timing for power systems: A multi-layered multi-receiver architecture," in Proc. Power Energy Conf. Illinois, Feb. 2014, op. 1-7.
L. Heng, D. B. Work, and G. X. Gao, "GPS signal authentication from co-operative peers," IEEE Trans. Intell. Transp. Syst, vol. 16, No. 4, pp. 1794-1805, Aug. 2015.
D. Radin, P. F. Swaszek, K. C. Seals, and R. J. Hartnett, "GNSS spoof detection based on pseudoranges from multiple Yeceivers," in Proc. 2015 Int. Tech. Meeting Inst. Navig., Jan. 2015, pp. 657-671.
C. Masreliez and R. Martin, "Robust Bayesian estimation for the linear model and robustifying the Kalman filter," IEEE Trans. Autom. Control, vol. AC-22, No. 3, pp. 361-371, Jun. 1977.
S. Farahmand, G. B. Giannakis, and D. Angelosante, "Doubly robust smoothing of dynamical processes via outlier sparsity constraints," IEEE Trans. Signal Process., vol. 59, No. 10, pp. 4529-4543, Oct. 2011.
7. Zhang, S. Gong, A. D. Dimitrovski, and H. Li, "Time synchronization attack in smart grid: Impact and analysis," IEEE Frans. Smart Grid,vol. 4, No. 1, pp. 87-98, Mar. 2013.
F. I. Karahanoglu, Bayram, and D. V. D. Ville, "A signal processing approach to generalized 1-D total variation," IEEE Trans. Signal Process., vol. 59, No. 11, pp. 5265-5274, Nov. 2011.
Energy.gov, Office of Electricity Delivery & Energy Reliability. Online. Available: http://energy.gov/oe/services/technology-development/smart-grid. Accessed: Dec. 18, 2020.
Electric sector failure scenarios and impact analyses—Version 3.0, National Electric Sector Cybersecurity Organization Resource (NESCOR), Elect Power Res Inst., Rep. Tech. Working Group 1, Version 1.0, Dec. 2015.
"Android GNSS." [Online], Available: https://developer.android.com/guide/topics/sensors/gnss.html.Accessed on: Dec. 18, 2020.

(56) References Cited

OTHER PUBLICATIONS

S. Boyd and L. Vandenberghe, Convex Optimization. Cambridge UK: Cambridge Univ. Press, 2004.
B. Motella et al., "Performance assessment of low cost GPS receivers under civilian spoofing attacks," in Proc. 5th ESA Workshop Satellite Navig. Technol. Eur. Workshop GNSS Signals Signal Process., Dec. 2010, pp. 1-8.
P. Teunissen, "Quality control in integrated navigation systems," IEEE Aerosp. Electron. Syst. Mag., vol. 5, No. 7, pp. 35-41, Jul. 1990.
"Model 1088b GPS satellite clock (40 ns)." [Online], Available: http://www.arbiter.com/catalog/product/model-1088b-gps-satellite-precis ion-time-clock-40ns.php Accessed on: Feb. 20, 2017.
R. G. Brown and P. Y. C. Hwang, "Introduction to Random Signals and Applied Kalman Filtering: With MATLAB Exercises and Solutions," Ch. 9, 3rd ed. New York, NY, USA: Wiley, 1997.
S. M. Kay, "Fundamentals of Statistical Signal Processing, vol. II: Detection Theory", Ch. 6, Englewood Cliffs, NJ, USA: Prentice-Hall, 1993.

\* cited by examiner

Algorithm 1: TSA Rejection and Mitigation (TSARM).

1: Set $k = 1$
2: while True do
3:     Batch $\mathbf{y}_l \; \forall l = k, \ldots, k + L - 1$
4:     Construct $\mathbf{H}, \mathbf{c}_l, \mathbf{F} \; \forall l = k, \ldots, k + L - 1$
5:     Compute $\mathbf{Q}_l$ and $\mathbf{R}_l$ (details provided in Section V)
6:     Estimate $\hat{\mathbf{x}}, \hat{\mathbf{s}}$ via (8)
7:     Assign $\hat{cb}_u[l] = \hat{x}[m], m = 2l - 1$ and $\hat{cb}_u[l] = \hat{x}[m], m = 2l \; \forall l = k, \ldots, k + L - 1$
8:     Assign $\hat{s}_b[l] = \hat{s}[m], m = 2l - 1$ and $\hat{s}_b[l] = \hat{s}[m], m = 2l \; \forall l = k, \ldots, k + L - 1$
9:     Modify $\hat{b}_u[l], \hat{b}_u[l], \rho[l]$ and $\dot{\rho}[l]$ via (10) $\forall l = 1, \ldots, L$ for the first window and $k + L - T_{\text{lag}} \leq l \leq k + L - 1$ for the windows afterwards
10:    Set $\mathbf{y}_l = \begin{pmatrix} \bar{\rho}[l] \\ \dot{\rho}[l] \end{pmatrix} \forall l = k, \ldots, k + L - 1$
11:    Output $t_R^{\text{UTC}}[l] = t_R[l] - \hat{b}_u[l] - \Delta t_{UTC} \; \forall l = k, \ldots, k + L - 1$ to the user for time stamping
12:    Slide the observation window by setting $k = k + T_{\text{lag}}$
13: end while

FIG. 3

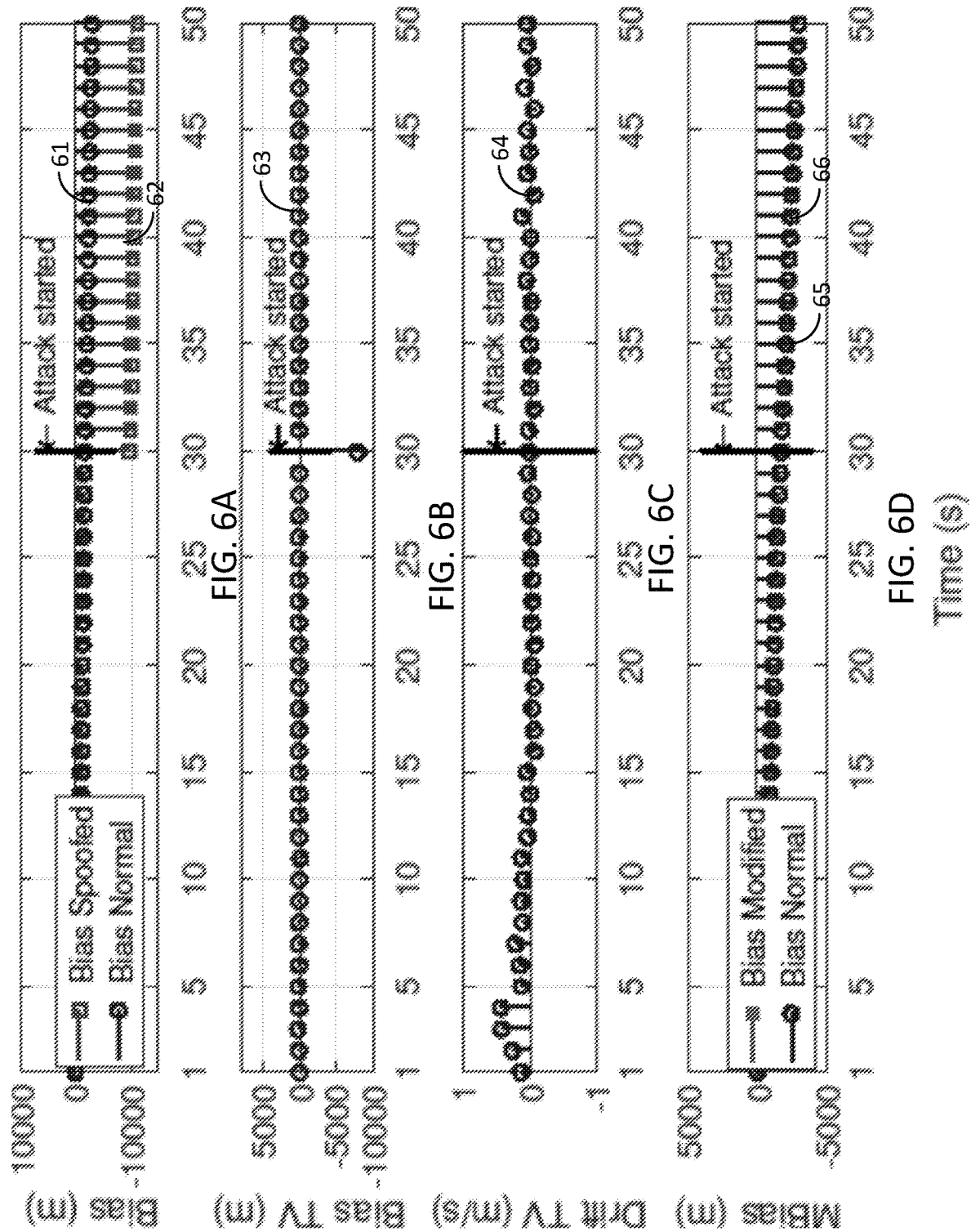

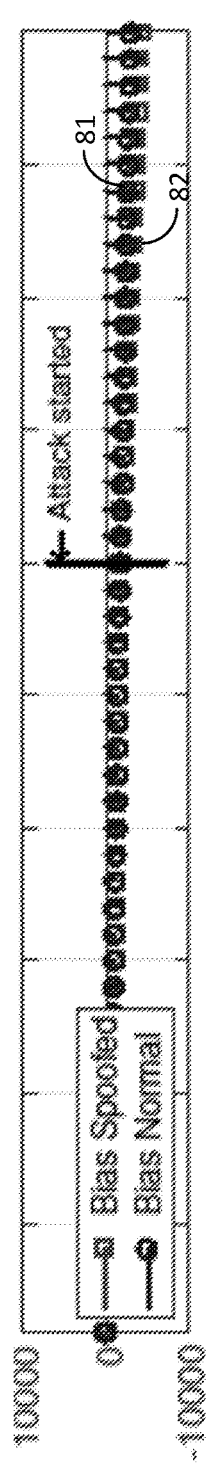
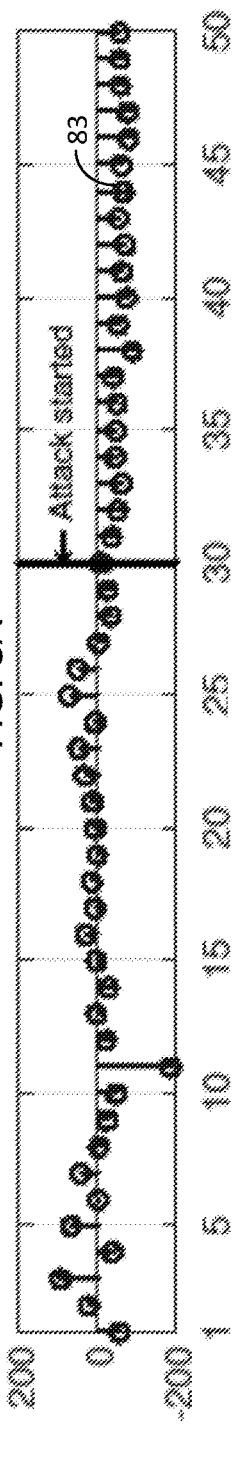
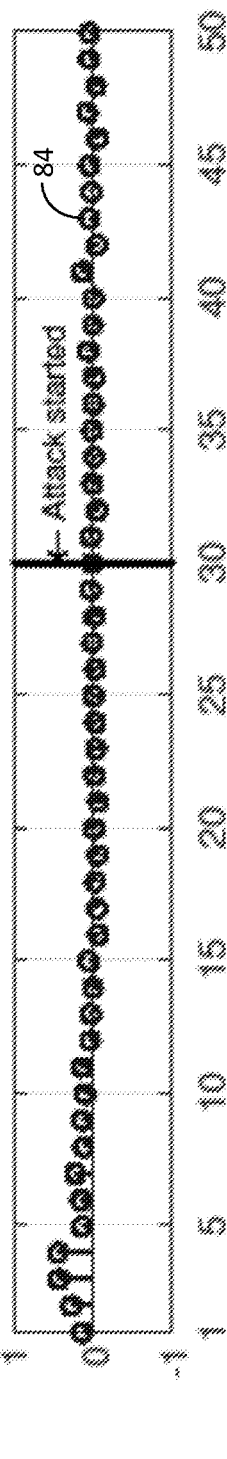
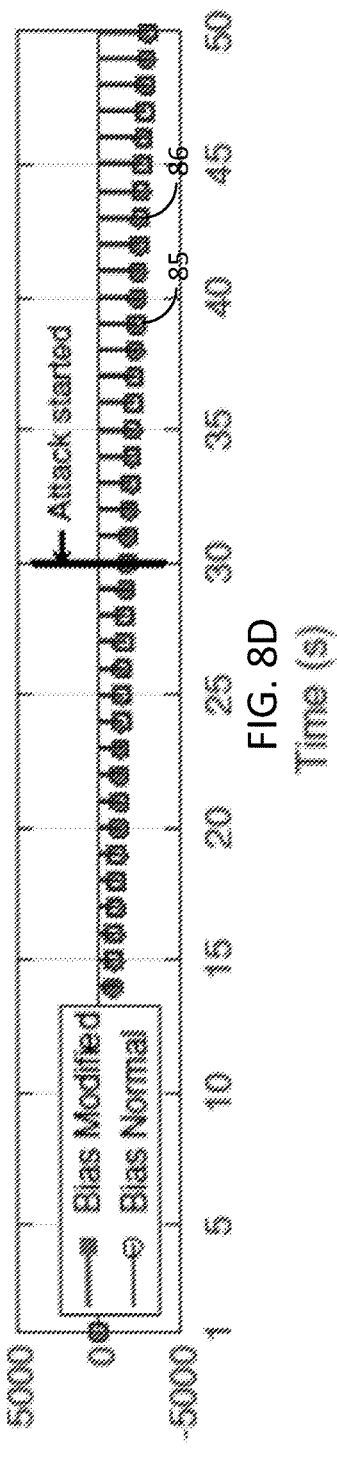
FIG. 8A
FIG. 8B
FIG. 8C
FIG. 8D
Time (s)

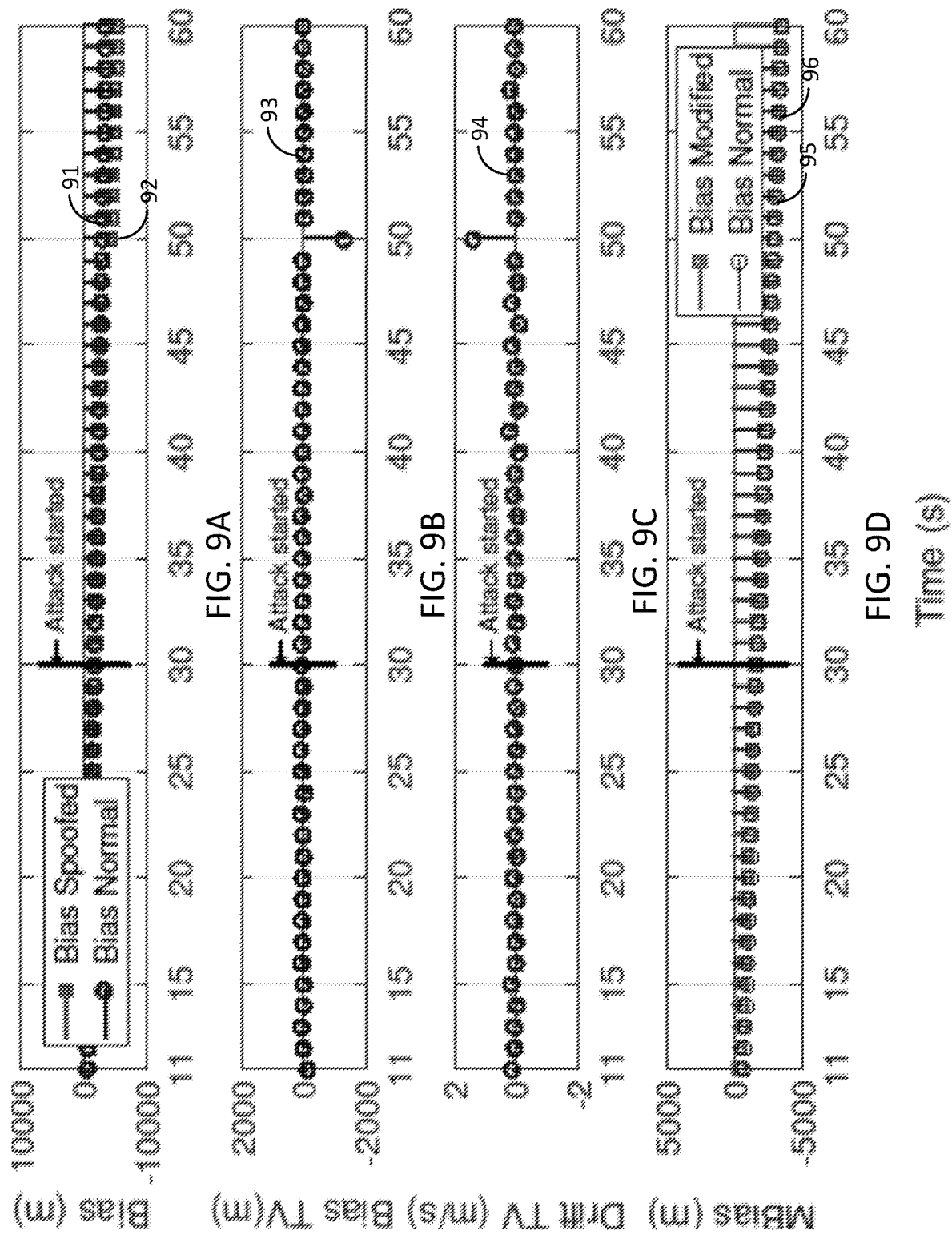

METHOD AND SYSTEM FOR DETECTING AND MITIGATING TIME SYNCHRONIZATION ATTACKS OF GLOBAL POSITIONING SYSTEM (GPS) RECEIVERS

CROSS-REFERENCE TO RELATED APPLICATIONS

This application is a nonprovisional application that claims priority to, and the benefit of the filing date of, U.S. provisional application Ser. No. 62/608,396, filed Dec. 20, 2017, entitled "REAL-TIME DETECTION AND MITIGATION OF TIME SYNCHRONIZATION ATTACKS ON THE GLOBAL POSITIONING SYSTEM," which is hereby incorporated by reference herein in its entirety.

GOVERNMENT RIGHTS STATEMENT

This invention was made with government support under grant Nos. 1462404 and 1719043 awarded by the National Science Foundation. The government has certain rights in this invention.

TECHNICAL FIELD

The invention relates to detecting and mitigating time synchronization attacks (TSAs) on Global Positioning System (GPS) receivers.

BACKGROUND

Infrastructures such as, for example, road tolling systems, terrestrial digital video broadcasting, cell phone and air traffic control towers, real-time industrial control systems, and Phasor Measurement Units (PMUs) heavily rely on synchronized precise timing for consistent and accurate network communications to maintain records and ensure their traceability. The GPS provides time reference of microsecond precision for such systems.

GPS-based time-synchronization systems use civilian GPS channels, which are open to the public. The unencrypted nature of these signals makes them vulnerable to unintentional interference and intentional attacks. Unauthorized manipulation of GPS signals leads to disruption of correct readings of GPS-based time references, and thus, is commonly referred to as a Time Synchronization Attack (TSA). To address the impact of malicious attacks, for instance on PMU data, the Electric Power Research Institute published a technical report that recognizes the vulnerability of PMUs to GPS spoofing under its scenario WAMPAC.12: GPS Time Signal Compromise. These attacks introduce erroneous time stamps, which are eventually equivalent to inducing wrong phase angle in the PMU measurements. The impact of TSAs on, for example, generator trip control, transmission line fault detection, voltage stability monitoring, disturbing event locationing, and power system state estimation has been studied and evaluated both experimentally and through simulations.

Intentional unauthorized manipulation of GPS signals is commonly referred to as GPS spoofing, and can be categorized based on the spoofer mechanism as follows:

Jamming (blocking): The spoofer sends high power signals to jam the normal operation of the receiver by disrupting the normal operation of the victim receiver, often referred to as loosing lock. Then, the victim receiver may lock onto the spoofer signal after jamming.

Data level spoofing: The spoofer manipulates the navigation data such as orbital parameters (ephemerides) that are used to compute satellite locations.

Signal level spoofing: The spoofer synthesizes GPS-like signals that carry the same navigation data as concurrently broadcasted by the satellites.

Record-and-replay attack: The spoofer records the authentic GPS signals and retransmits them with selected delays at higher power. Typically the spoofer starts from low power transmission and increases its power to force the receiver to lock onto the spoofed (delayed) signal. The spoofer may change the transmitting signal properties such that the victim receiver miscalculates its estimates.

Common off-the-shelf GPS receivers lack proper mechanisms to detect these attacks. A group of studies have been directed towards evaluating the requirements for successful attacks, theoretically and experimentally. For instance, a real spoofer has been designed as a Software Defined Radio (SDR) that records authentic GPS signals and retransmits fake signals. It provides the option of manipulating various signal properties for spoofing.

Known or proposed spoofing detection techniques employ countermeasures to reduce the effect of malicious attacks on GPS receivers. Such countermeasures typically rely on a technique known as Receiver Autonomous Integrity Monitoring (RAIM). Off-the shelf GPS receivers typically apply RAIM consistency checks to detect the anomalies exploiting measurement redundancies. For example, RAIM may evaluate the variance of GPS solution residuals and consequently generate an alarm if it exceeds a predetermined threshold. Similar variance authentication techniques have also been proposed based on hypothesis testing on the Kalman filter innovations; however, they are vulnerable to smarter attacks that pass RAIM checks or the innovation hypothesis testing.

Countermeasures have been designed that seek to make the receivers robust against more sophisticated attacks. A countermeasure known as vector tracking exploits the signals from all satellites jointly and feedbacks the predicted position, velocity, and time (PVT) to the internal lock loops of the GPS receiver. If an attack occurs, the lock loops become unstable, which is an indication of attack. Cooperative GPS receivers employ a countermeasure that performs authentication checks by analyzing the integrity of measurements through peer-to-peer communications. Also, a quick sanity check countermeasure for stationary time synchronization devices is to monitor the estimated location. As the true location can be known a priori, any large shift that exceeds the maximum allowable position estimation error can be an indication of attack. The receiver carrier-to-noise receiver can be used as an indicator of a spoofing attack. In accordance with one such countermeasure, the difference between the carrier-to-noise ratios of two GPS antennas has been proposed as a metric of PMU trustworthiness. In addition, some approaches compare the receiver's clock behavior against its statistics in normal operation.

Although prior research studies address a breadth of problems related to GPS spoofing, there are certain gaps that should still be addressed: 1) Most of the studies do not provide analytical models for different types of spoofing attacks. The possible attacking procedure models are crucial for designing the countermeasures against the spoofing attacks. 2) Although some countermeasures might be effective for a certain type of attack, a comprehensive countermeasure development is still lacking for defending the GPS receiver. This is practically needed as the receiver cannot predict the type of attack. 3) The main effort in the literature is in detection of possible spoofing attacks. However, even with the spoofing detection, the GPS receiver cannot resume its normal operation, especially in PMU applications where the network's normal operation cannot be interrupted. So, the spoofing countermeasures should not only detect the attacks, but also mitigate their effects so that the network can resume its normal operation. 4) There is a need for simpler solutions which can be integrated with current systems.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

FIG. 3 shows an algorithm that is performed by a Time Synchronization Attack Rejection and Mitigation (TSARM) solution in accordance with a representative embodiment to detect a TSA on a GPS receiver, to estimate an effect of the TSA on the GPS receiver and to use the estimate to mitigate the effect of the TSA on the GPS receiver.

FIGS. 6A-6D graphically illustrate the result of solving Equation 8 of the TSARM solution of the present disclosure using GPS measurements perturbed by a Type I attack.

FIGS. 8A-8D graphically illustrate the results obtained by performing Algorithm 1 shown in FIG. 3 for t=1 s to t=50 s.

FIGS. 9A-9D graphically illustrate the results obtained by performing Algorithm 1 shown in FIG. 3 for t=11 s to t=60 s.

DETAILED DESCRIPTION

Figure 1A:
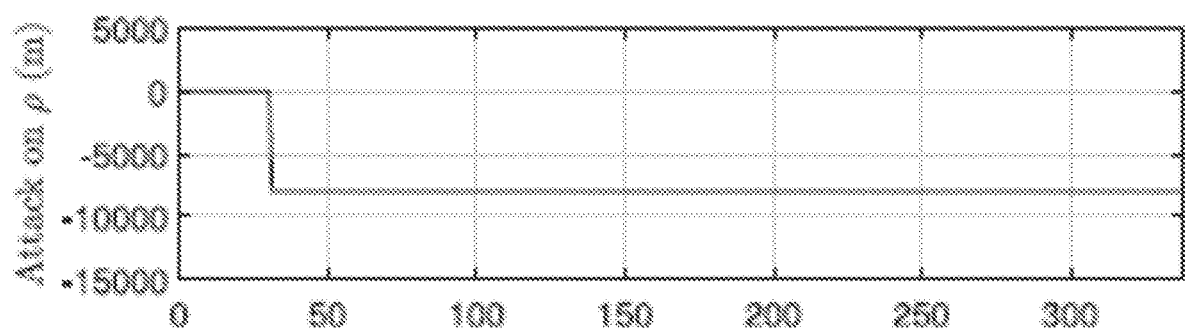
FIGS. 1A and 1B graphically illustrate the pseudorange and the pseudorange rate, respectively, during a Type I TSA that occurs at t=30 s.

In accordance with the present disclosure, a system and method are provided for detecting and estimating a TSA on a GPS receiver and using the estimation to mitigate the effect of the TSA on the GPS receiver. The system and method can be implemented in such a way that the aforementioned gaps in the known or proposed solutions are satisfactorily addressed. In particular, the system and method can be implemented to provide a TSA countermeasure solution that: 1) provides a comprehensive countermeasure against different types of TSAs; 2) allows the GPS receiver to continue its normal operation, which is especially beneficial in PMU applications where the network's normal operation cannot be interrupted; in other words, the solution not only detects TSAs, but also mitigate their effects so that the network can continue its normal operation; and 3) is simpler and can be integrated with current GPS receivers without having to alter the circuitry of the GPS receivers.

In the following detailed description, a few illustrative, or representative, embodiments are described to demonstrate the inventive principles and concepts. For purposes of explanation and not limitation, representative embodiments disclosing specific details are set forth in order to provide a thorough understanding of an embodiment according to the present teachings. However, it will be apparent to one having ordinary skill in the art having the benefit of the present disclosure that other embodiments according to the present teachings that depart from the specific details disclosed herein remain within the scope of the appended claims. Moreover, descriptions of well-known apparatuses and methods may be omitted so as to not obscure the description of the representative embodiments. Such methods and apparatuses are clearly within the scope of the present teachings.

The terminology used herein is for purposes of describing particular embodiments only, and is not intended to be limiting. The defined terms are in addition to the technical and scientific meanings of the defined terms as commonly understood and accepted in the technical field of the present teachings.

As used in the specification and appended claims, the terms "a," "an," and "the" include both singular and plural referents, unless the context clearly dictates otherwise. Thus, for example, "a device" includes one device and plural devices.

Relative terms may be used to describe the various elements' relationships to one another, as illustrated in the accompanying drawings. These relative terms are intended to encompass different orientations of the device and/or elements in addition to the orientation depicted in the drawings.

It will be understood that when an element is referred to as being "connected to" or "coupled to" or "electrically coupled to" another element, it can be directly connected or coupled, or intervening elements may be present.

The term "memory" or "memory device", as those terms are used herein, are intended to denote a computer-readable storage medium that is capable of storing computer instructions, or computer code, for execution by one or more processors. References herein to "memory" or "memory device" should be interpreted as one or more memories or memory devices. The memory may, for example, be multiple memories within the same computer system. The memory may also be multiple memories distributed amongst multiple computer systems or computing devices.

A "processor" or "processing logic," as those terms are used herein, encompass an electronic component that is able to execute a computer program, portions of a computer program or computer instructions. References herein to a computer comprising "a processor" should be interpreted as a computer having one or more processors or processing cores. The processor may, for instance, be a multi-core processor. A processor may also refer to a collection of processors within a single computer system or distributed amongst multiple computer systems. The term "computer" should also be interpreted as possibly referring to a collection or network of computers or computing devices, each comprising a processor or processors. Instructions of a computer program can be performed by multiple processors that may be within the same computer or that may be distributed across multiple computers.

The terms "TSA" and "spoofing attack" are used interchangeably herein to refer to an attack that has a direct or indirect effect on the clock bias and/or the clock drift of a GPS receiver. The term "GPS receiver," as that term is used herein, denotes any receiver of any device that is configured to perform GPS Position, Velocity, and Time (PVT) estimation via GPS trilateration, which relies on the known location of satellites as well as distance measurements between satellites and the receiver.

Exemplary, or representative, embodiments will now be described with reference to the figures, in which like reference numerals represent like components, elements or features. It should be noted that features, elements or components in the figures are not intended to be drawn to scale, emphasis being placed instead on demonstrating inventive principles and concepts.

The method and system of the present disclosure do not perform only spoofing detection, but also estimate the spoofing attack. The spoofed signatures, i.e., clock bias and/or drift, are corrected using the estimated attack. The system and method are capable of detecting even the smartest attacks that maintain the consistency in the measurement set. A review of the spoofing detection domain shows that most of the prior art solutions operate at the baseband signal processing domain, which necessitates manipulation of the circuitry of the GPS receiver. In contrast, in accordance with a preferred embodiment, the solution of the present disclosure operates in the navigation domain, thereby obviating the need to alter circuitry of the GPS receiver.

In accordance with a preferred embodiment, the TSA detection and mitigation solution of the present disclosure comprises three parts, namely, 1) a model that analytically models a TSA on the GPS receiver's clock bias and drift, 2) an estimator that performs an estimation algorithm that detects the TSA and estimates an effect of the TSA on the GPS receiver's clock bias and drift, and 3) a mitigator that performs a mitigation algorithm that uses the estimated effect to correct the GPS receiver's clock bias and clock drift. The solution of the present disclosure, i.e., the combined system and method, is referred to interchangeably herein as "the solution of the present disclosure" or as the "Time Synchronization Attack Rejection and Mitigation (TSARM) solution." In accordance with the preferred embodiment, the TSARM solution detects, estimates and mitigates the TSA in real time so that the GPS receiver can continue its normal operation with the corrected timing for the application being performed. The TSARM solution is capable of detecting, estimating and mitigating the effects of the smartest and most consistent reported attacks in which the position of the victim GPS receiver is not altered and the attacks on the pseudoranges are consistent with the attacks on pseudorange rates.

Unlike the aforementioned known or proposed TSA detection solutions, the TSARM solution is capable of detecting the anomalous behavior of the spoofer even if the measurement integrity is preserved. The spoofing mitigation component of the TSARM solution preferably is implemented to have the following desirable attributes: 1) the mitigator solves an optimization problem that preferably is implemented as a small quadratic program, which makes it applicable to commonly used devices; 2) the TSARM solution can be easily integrated into existing GPS receiver systems without changing the receiver's circuitry or necessitating the use of multiple GPS receivers; 3) the TSARM solution can run in parallel with current GPS receivers and provide an alert if spoofing has occurred; and 4) without halting the normal operation of the GPS receiver or of the application that is relying on the GPS receiver, corrected timing estimates can be computed to allow normal operations to continue.

To demonstrate inventive principles and concepts, the TSARM solution has been evaluated using a commercial GPS receiver with open-source measurements access. These measurements have been perturbed with spoofing attacks specific to PMU operation. Applying the TSARM solution demonstrated that the clock bias of the GPS receiver can be corrected within the maximum allowable error in the PMU IEEE C37.118 standard.

In the following discussion, a brief description of the GPS is described in Section I. A general discussion models for possible spoofing attacks is provided in Section II. Section III provides a discussion of the TSARM solution for detect, estimating and mitigating the effect of TSAs. A numerical evaluation of the TSARM solution results is provided in Section IV followed by the conclusions in Section V.

I. GPS PVT ESTIMATION

In this section, a brief overview of the GPS Position, Velocity, and Time (PVT) estimation is presented. The main idea of localization and timing through GPS is trilateration, which relies on the known location of satellites as well as distance measurements between satellites and the GPS receiver. In particular, the GPS signal from satellite n contains a set of navigation data, comprising the ephemeris and the almanac (typically updated every 2 hours and one week, respectively), together with the signal's time of transmission ($t_n$). This data is used to compute the satellite's position $p_n=[x_n(t_n), y_n(t_n), z_n(t_n)]^T$ in Earth Centered Earth Fixed (ECEF) coordinates, through a function known to the GPS receiver. Let $t_R$ denote the time that the signal arrives at the GPS receiver. The distance between the user (GPS receiver) and satellite n can be found by multiplying the signal propagation time $t_R-t_n$ by the speed of light c. This quantity is called pseudorange: $\rho_n=c(t_R-t_n)$, n=1, ..., N, where N is the number of visible satellites. The pseudorange is not the exact distance because the receiver and satellite clocks are both biased with respect to the absolute GPS time. Let the receiver and satellite clock biases be denoted by $b_u$ and $b_n$, respectively. Therefore, the time of reception $t_R$ and $t_n$ are related to their absolute values in GPS time as follows: $t_R=t^{GPS}+b_u$; $t_n=t^{GPS}+b_n$, n=1, ..., N. The $b_n$'s are computed from the received navigation data and are considered known. However, the bias $b_u$ must be estimated and should be subtracted from the measured $t_R$ to yield the receiver absolute GPS time $t_R^{GPS}$, which can be used as a time reference used for synchronization. Synchronization systems time stamp their readings based on the Coordinated Universal Time (UTC) which has a known offset with the GPS time as $t^{UTC}=t^{GPS}-\Delta t_{UTC}$ where $\Delta t_{UTC}$ is available online.

Let $p_u=[x_u, y_u, z_u]^T$ be the coordinates of the GPS receiver, and $d_n$ its true range to satellite n. This distance is expressed via the locations $p_u$ and $p_n$ and the times $t_R^{GPS}$ and $t_n^{GPS}$ as $d_n = \|p_n - p_u\|_2 = c(t_R^{GPS} - t_n^{GPS})$. Therefore, the measurement equation becomes $$\rho_n = \|p_n - p_u\|_2 + c(b_u - b_n) + \varepsilon_{\rho_n} \quad (1)$$

where n=1, ..., N, and $\varepsilon_{\rho_n}$ represents the noise. The un-knowns in (1) are $x_u$, $y_u$, $z_u$, and $b_u$ and, therefore, measurements from at least four satellites are needed to estimate them.

Furthermore, the nominal carrier frequency ($f_c$=1575.42 MHz) of the transmitted signals from the satellite experiences a Doppler shift at the receiver due to the relative motion between the receiver and the satellite. Hence, in addition to pseudoranges, pseudorange rates are estimated from the Doppler shift and are related to the relative satellite velocity $v_n$ and the user velocity $v_u$ via $$\dot{\rho}_n = (v_n - v_u)^T \frac{p_n - p_u}{\|p_n - p_u\|} + \dot{b}_u + \varepsilon_{\dot{\rho}_n} \quad (2)$$

where $\dot{b}_u$ is the clock drift.

In most cases, there are more than four visible satellites, resulting in an overdetermined system of equations in Equations 1 and 2. Typical GPS receivers use nonlinear Weighted Least Squares (WLS) to solve Equations 1 and 2 and provide an estimate of the location, velocity, clock bias, and clock drift of the receiver, often referred to as the PVT solution. To additionally exploit the consecutive nature of the estimates, a dynamical model is used. The conventional dynamical model for stationary receivers is a random walk model:

$$\begin{pmatrix} x_u[l+1] \\ y_u[l+1] \\ z_u[l+1] \\ b_u[l+1] \\ \dot{b}_u[l+1] \end{pmatrix} = \begin{pmatrix} I_{3\times 3} & 0_{3\times 2} \\ 0_{2\times 3} & \begin{matrix} 1 & \Delta t \\ 0 & 1 \end{matrix} \end{pmatrix} \begin{pmatrix} x_u[l] \\ y_u[l] \\ z_u[l] \\ b_u[l] \\ \dot{b}_u[l] \end{pmatrix} + w[l] \quad (3)$$

where l is the time index, $\Delta t$ is the time resolution (typically 1 second), and w is the noise. The dynamical system of Equation 3 and measurement Equations 1 and 2 are the basis for estimating the user PVT using the Extended Kalman Filter (EKF).

Previous works have shown that simple attacks are able to mislead the solutions of WLS or EKF. Stationary GPS-based time synchronization systems are typically equipped with the "position-hold mode" option, which can potentially detect an attack if the GPS position differs from a known receiver location by more than a maximum allowed error. This can be used as the first indication of attack, but more advanced spoofers have the ability to manipulate the clock bias and drift estimates of the stationary receiver without altering its position and velocity (the latter should be zero). So, even with EKF on the conventional dynamical models, perturbations on the pseudoranges in Equation 1 and pseudorange rates in Equation 2 can be designed so that they directly result in clock bias and drift perturbations without altering the position and velocity of the receiver.

II. MODELING TIME SYNCHRONIZATION ATTACKS

This section puts forth a general attack model that encompasses the attack types discussed in the literature. This model is instrumental for designing the anti-spoofing technique discussed in the next section.

While TSAs have different physical mechanisms, they manifest themselves as attacks on pseudorange and pseudorange rates. These attacks can be modeled as direct perturbations on Equations 1 and 2 as $$\rho_s[l] = \rho[l] + s_\rho[l]$$

$$\dot{\rho}_s[l] = \dot{\rho}[l] + s_{\dot{\rho}}[l] \quad (4)$$

where $s_\rho$ and $s_{\dot{\rho}}$ are the spoofing perturbations on pseudoranges and pseudorange rates, respectively; and $\rho_s$ and $\dot{\rho}_s$ are, respectively, the spoofed pseudorange and pseudorange rates.

A typical spoofer follows practical considerations to introduce feasible attacks. These considerations can be formulated as follows: 1) An attack is meaningful if it infringes the maximum allowed error defined in the system specification. For instance in PMU applications, the attack should exceed the maximum allowable error tolerance specified by the IEEE C37.118 Standard, which is 1% Total Variation Error (TVE), equivalently expressed as 0.573° phase angle error, 26.65 μs clock bias error, or 7989 m of distance-equivalent bias error. On the other hand, CDMA cellular networks require timing accuracy of 10 μs. 2) Due to the peculiarities of the GPS receivers, the internal feedback loops may lose lock on the spoofed signal if the spoofer's signal properties change rapidly. 3) The designed spoofers have the ability to manipulate the clock drift (by manipulating the Doppler frequency) and clock bias (by manipulating the code delay). These perturbations can be applied separately, however, the smartest attacks maintain the consistency of the spoofer's transmitted signal. This means that the pertubations on pseudoranges $s_\rho$ are the integration of perturbations over pseudorange rates $s_{\dot{\rho}}$ in Equation (4).

Figure 1B:
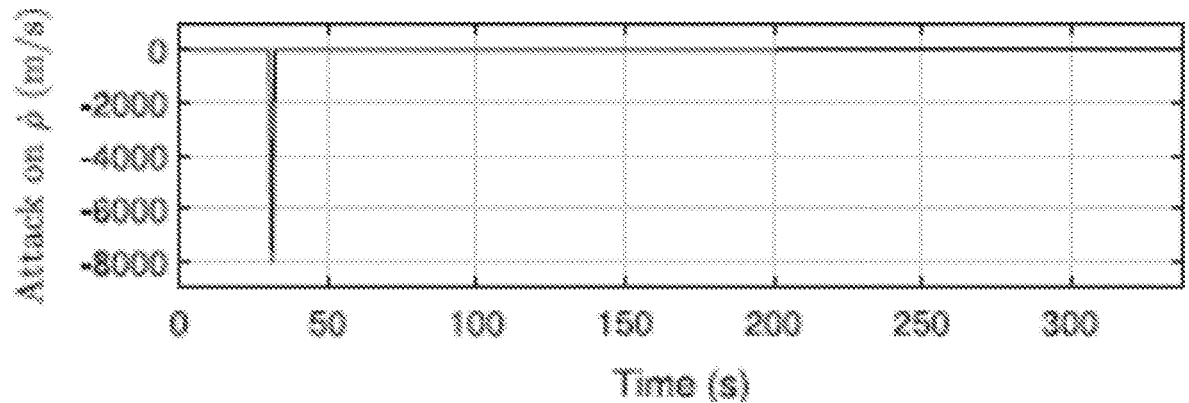

Here, distinguishing between two attack procedures is advantageous as the literature includes very few research reports on the technical intricacies of the spoofer constraints:

Type I: The spoofer manipulates the authentic signal so that the bias abruptly changes in a very short time. FIGS. 1A and 1B graphically illustrate the pseudorange and the pseudorange rate, respectively, during a Type I attack. The attack on the pseudoranges suddenly appears at t=30 s and perturbs the pseudoranges by 8000 m. The equivalent attack on pseudorange rates shown in FIG. 1B is a Dirac delta function.

Figure 2A:
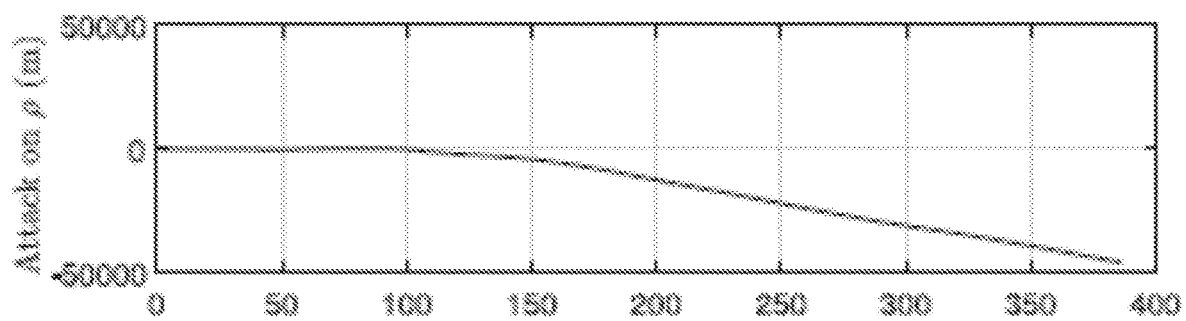
FIGS. 2A and 2B graphically illustrate a Type II TSA on pseudorange and pseudorange rate, respectively, that starts at t=30 s and perturbs the pseudoranges gradually with distance equivalent velocity not exceeding 400 m/s.
Figure 2B:
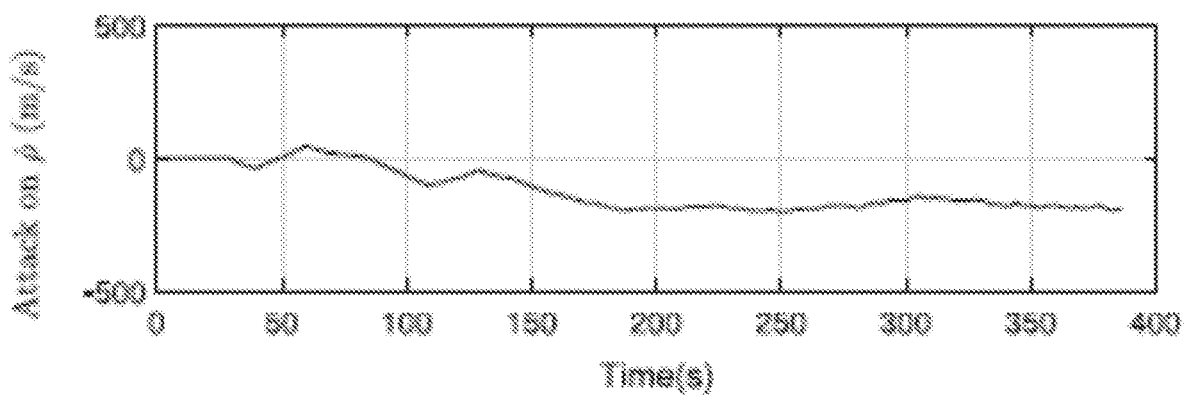

Type II: The spoofer gradually manipulates the authentic signals and changes the clock bias through time. This attack can be modeled by $$s_\rho[l] = s_\rho[l-1] + s_{\dot{\rho}}[l]\Delta t$$

$$s_{\dot{\rho}}[l] = s_{\dot{\rho}}[l-1] + s_{\ddot{\rho}}[l]\Delta t \quad (5)$$

where $s_{\dot{\rho}}$ and $s_{\ddot{\rho}}$ are, respectively, called distance equivalent velocity and distance equivalent acceleration of the attack. To maintain the victim receiver lock on the spoofer's signals, the attack should not exceed a certain distance equivalent velocity. Two such limiting numbers are reported in the literature, namely, $|s_{\dot{\rho}}| \leq 400$ m/s and $|s_{\dot{\rho}}| \leq 1000$ m/s. The acceleration to reach the maximum spoofing velocity is reported to be $|s_{\ddot{\rho}}| \leq 5$ m/s². The spoofer acceleration s can be random, which makes a Type II attack quite general. The distance equivalent velocity can be converted to the equivalent bias change rate (in s/s) through dividing the velocity by the speed of light. FIGS. 2A and 2B graphically illustrate this Type II attack. The attack on the pseudoranges, which is shown in FIG. 2A, starts at t=30 s and perturbs the pseudoranges gradually with distance equivalent velocity not exceeding 400 m/s and maximum distance equivalent random acceleration satisfying $|\ddot{s}_\rho| \leq 5$ m/s².

The attack models graphically demonstrated by FIGS. 1A-2B are quite general and can mathematically capture most attacks on the victim receiver's measurements (pseudoranges and pseudorange rates). In another words, Type I and Type II attacks can be the result of data level spoofing, signal level spoofing, record-and-replay attack, or a combination of the aforementioned attacks. The main difference between Type I and Type II attacks is the spoofing speed. The speed of the attack depends on the capabilities of the spoofer with respect to manipulating various features of the GPS signals. Indeed, attacks of different speeds have been reported in the literature.

In the next section, a dynamical model for the clock bias and drift is introduced which incorporates these attacks. Based on this dynamical model, an optimization problem to estimate these attacks along with the clock bias and drift is provided.

III. TSA-AWARE DYNAMICAL MODEL, TSA REJECTION AND MITIGATION

This section introduces a dynamical model to accommodate the spoofing attack and a method to estimate the attack. Afterwards, a procedure for approximately nullifying the effects of the attack on the clock bias and drift is introduced.

A. Novel TSA-Aware Dynamical Model

Modeling of the attack on pseudoranges and pseudorange rates is motivated by the attack types discussed in the previous section. These attacks do not alter the position or velocity, but only the clock bias and clock drift. The TSARM model does not follow the conventional dynamical model for stationary receivers, which allows the position of the receiver to follow a random walk model. Instead, in accordance with a representative embodiment, the known position and velocity of the victim receiver are exploited jointly. The state vector contains the clock bias and clock drift, and the attacks are explicitly modeled on these components, leading to the following dynamical model:

$$\underbrace{\begin{pmatrix} cb_u[l+1] \\ c\dot{b}_u[l+1] \end{pmatrix}}_{x_{l+1}} = \underbrace{\begin{pmatrix} 1 & \Delta t \\ 0 & 1 \end{pmatrix}}_{F} \underbrace{\begin{pmatrix} cb_u[l] \\ c\dot{b}_u[l] \end{pmatrix}}_{x_l} + \underbrace{\begin{pmatrix} cs_b[l] \\ cs_{\dot{b}}[l] \end{pmatrix}}_{s_l} + \underbrace{\begin{pmatrix} cw_b[l] \\ cw_{\dot{b}}[l] \end{pmatrix}}_{w_l} \quad (6)$$

where $s_b$ and $s_{\dot{b}}$ are the attacks on clock bias and clock drift and $w_b$ and $w_{\dot{b}}$ are colored Gaussian noise samples with a covariance function. Here, both sides are multiplied with c, which is a typically adopted convention. The state noise covariance matrix, $Q_l$, is particular to the crystal oscillator of the GPS receiver.

Similarly, define $\rho[l]=[\rho_1[l], \ldots, \rho_N[l]]^T$ and $\dot{\rho}[l]=[\dot{\rho}_1[l], \ldots, \dot{\rho}_N[l]]^T$. The measurement equation can be expressed as $$\underbrace{\begin{pmatrix} \rho[l] \\ \dot{\rho}[l] \end{pmatrix}}_{y_l} = \underbrace{\begin{pmatrix} 1_{N\times 1} & 0_{N\times 1} \\ 0_{N\times 1} & 1_{N\times 1} \end{pmatrix}}_{H} \underbrace{\begin{pmatrix} cb_u[l] \\ c\dot{b}_u[l] \end{pmatrix}}_{x_l} + \quad (7)$$

-continued $$\underbrace{\begin{pmatrix} \|p_1[l] - p_u[l]\| \\ \vdots \\ \|p_N[l] - p_u[l]\| \\ (v_1[l] - v_u[l])^T \cdot \frac{p_1[l] - p_u[l]}{\|p_1[l] - p_u[l]\|} \\ \vdots \\ (v_N[l] - v_u[l])^T \cdot \frac{p_N[l] - p_u[l]}{\|p_N[l] - p_u[l]\|} \end{pmatrix}}_{c_l} - \begin{pmatrix} cb_1[l] \\ \vdots \\ cb_N[l] \\ c\dot{b}_1[l] \\ \vdots \\ c\dot{b}_N[l] \end{pmatrix} + \underbrace{\begin{pmatrix} \varepsilon_{\rho_1}[l] \\ \vdots \\ \varepsilon_{\rho_N}[l] \\ \varepsilon_{\dot{\rho}_1}[l] \\ \vdots \\ \varepsilon_{\dot{\rho}_N}[l] \end{pmatrix}}_{\varepsilon_l}.$$

Explicit modeling of $p_u$ and $v_u$ in $c_l$ indicates that the dynamical model benefits from using the stationary victim receiver's known position and velocity (the latter is zero). The measurement noise covariance matrix, $R_l$, is obtained through the measurements in the receiver. A detailed explanation of how to obtain the state and measurement covariance matrices, $Q_l$ and $R_l$, is provided in Section IV. It should be noted that the state covariance $Q_l$ only depends on the victim receiver's clock behavior and does not change under spoofing. However, the measurement covariance matrix, $R_l$, experiences contraction. The reason is that to ensure that the victim receiver maintains lock to the fake signals, the spoofer typically applies a power advantage over the real incoming GPS signals at the victim receiver's front end.

Equations 6 and 7 together define the model of the TSARM solution in accordance with a representative embodiment. One of the unique aspects of the model is that it models the TSA, which is not the case with the aforementioned walk-on model that is traditionally used to detect spoofing. Equations 6 and 7 define, respectively, a dynamical model portion of the model and a measurement model portion of the model. Comparing Equations 5-7, it can be seen that TSAs that do not alter the position and velocity transfer the attack on pseudoranges and pseudorange rates directly to clock bias and clock drift. Thus, it holds that $s_\rho = cs_b$ and $\dot{s}_\rho = cs_{\dot{b}}$.

B. Attack Detection

Let $l=k, \ldots, k+L-1$ define the time index within an observation window of length L, where k is the running time index. The solution to the dynamical model of (6) and (7) is obtained through stacking L measurements and forming the following optimization problem:

$$(\hat{x}, \hat{s}) = \underset{x,s}{\operatorname{argmin}} \left\{ \frac{1}{2} \sum_{l=k}^{k+L-1} \|y_l - Hx_l - c_l\|_{R_l^{-1}}^2 + \right. \quad (8)$$

$$\left. \frac{1}{2} \sum_{l=k}^{k+L-1} \|x_{l+1} - Fx_l - s_l\|_{Q_l^{-1}}^2 + \sum_{l=k}^{k+L-1} \lambda \|Ds_l\|_1 \right\}$$

Where $\|x\|_M^2 = x^T M x$, $\hat{x}=[x_1, \ldots, \hat{x}_L]^T$ are the estimated states, $\hat{s}=[\hat{s}_1, \ldots, \hat{s}_L]^T$ are the estimated attacks, $\lambda$ is a regularization coefficient, and D is an L×2 L total variation matrix which forms the variation of the signal over time as $$D = \begin{pmatrix} -1 & 0 & 1 & 0 & \ldots & 0 \\ 0 & -1 & 0 & 1 & \ldots & 0 \\ \vdots & \vdots & \ddots & \ddots & \ddots & \vdots \\ 0 & \ldots & 0 & -1 & 0 & 1 \end{pmatrix}. \quad (9)$$

Equation 8 corresponds to the aforementioned estimator of the TSARM solution. As indicated above, the estimator performs an estimation algorithm that detects the TSA and estimates an effect of the TSA on the GPS receiver's clock bias and drift. The first term in Equation 8 is the weighted residuals in measurement equation 7. The second term in Equation 8 is the weighted residuals of the state equation. The last regularization term in Equation 8 promotes sparsity over the total variation of the estimated attack. The optimization algorithm of Equation 9 is a multi-objective optimization algorithm, with each of the above-mentioned terms being an objective of the multi-objective optimization algorithm.

In Equation 8, the clock bias and clock drift are estimated jointly with the attack. Here, the model of the two types of attacks discussed above should be considered. In a Type I attack, a step attack is applied over the pseudoranges. The solution to the clock bias equivalently experiences a step at the attack time. The term $$\|Ds_l\|_1 = \sum_{l=k+1}^{k+L-1} [|s_b[l] - s_b[l-1]| + |s_{\dot{b}}[l] - s_{\dot{b}}[l-1]|]$$

indicates a rise as it tracks the significant differences between two subsequent time instants. If the magnitude of the estimated attack in two adjacent times does not change significantly, the total variation of the attack is close to zero. Otherwise, in the presence of an attack, the total variation of the attack includes a spike at the attack time.

In a Type II attack, the total variation of the attack does not show significant changes as the attack magnitude is small at the beginning and the sparsity is not evident initially. Although it is meaningful to expect only few nonzero entries in the total variation of the attacks in general, this is not a necessary condition for capturing the attacks during initial small total variation magnitudes. This means that explicit modeling of the attacks with the model of Equations 6 and 7 and estimation through Equation 8 does not require the attacks to exhibit sparsity over the total variation. Furthermore, when the bias and bias drift are corrected using the estimated attack, as will be described in the next section, sparsity over the total variation appears for subsequent time instants. In these time instants, the attack appears to be more prominent, and in effect, the low dynamic behavior of the attack is magnified, a fact that facilitates the attack detection and will also be verified numerically below. This effect is a direct consequence of Equation 8 and of the mitigation process discussed in the next section.

Equation 8 is an expression of an optimization problem, which boils down to solving a simple quadratic problem in accordance with an embodiment. Specifically, the epigraph trick in convex optimization can be used to transform the $l_1$-norm into linear constraints. The observation window L slides for a lag time $T_{lag}<L$, which can be set to $T_{lag}=1$ for real time operation. The next section details the sliding window operation of the estimation algorithm, and elaborates on how to use the solution of Equation 8 in order to provide corrected bias and drift.

C. State Correction

In the observation window of length L, the estimated attacks is used to compensate the impact of the attack on the clock bias, clock drift, and measurements.

Revisiting the attack model in Equation 6, the bias at time l+1 depends on the clock bias and clock drift at time l. This dependence successively traces back to the initial time. Therefore, any attack on the bias that occurred in the past is accumulated through time. A similar observation is valid for the clock drift. The clock bias at time l is therefore contaminated by the cumulative effect of the attack on both the clock bias and clock drift in the previous times. The correction method takes into account the previously mentioned effect and modifies the bias and drift by subtracting the cumulative outcome of the clock bias and drift attacks as follows:

$$\begin{pmatrix} c\tilde{b}_u[l] \\ \rho[l] \end{pmatrix} = \begin{pmatrix} c\hat{b}_u[l] \\ \rho[l] \end{pmatrix} - \left( \sum_{l'=k}^{l} \hat{s}_b[l'] - \sum_{l'=k}^{l-1} \hat{s}_{\dot{b}}[l']\Delta t \right)1 \quad (10)$$

$$\begin{pmatrix} c\tilde{\dot{b}}_u[l] \\ \tilde{\dot{\rho}}[l] \end{pmatrix} = \begin{pmatrix} c\hat{\dot{b}}_u[l] \\ \dot{\rho}[l] \end{pmatrix} - \left( \sum_{l'=k}^{l} \hat{s}_{\dot{b}}[l'] \right)1$$

where $\tilde{b}_u$ and $\tilde{\dot{b}}_u$ are, respectively, the corrected clock bias and clock drift, $\tilde{p}$ and $\tilde{\dot{p}}$ are, respectively, the corrected pseudorange and pseudorange rates, and 1 is an all ones vector of length N+1. In Equation 10, l=1, . . . , L for the first observation window (k=1) and $k+L-T_{lag} \leq l \leq k+L-1$ for the observation windows afterwards. This ensures that the measurements and states are not doubly corrected. The corrected measurements are used for solving (8) for the next observation window.

In accordance with a preferred embodiment, the aforementioned mitigator performs a mitigation, or correction, algorithm in accordance with Equation 10 to mitigate the effect of the TSA detected by the estimation algorithm defined by Equation 8. The overall attack detection, estimation and mitigation procedure is illustrated by Algorithm 1 shown in FIG. 3. Lines 3-5 of the Algorithm 1 correspond to Equation 6. Line 6 of Algorithm 1 corresponds to Equation 8. Lines 7-12 of Algorithm 1 correspond to Equation 10. After the receiver collects L measurements, the model described by Equations 6 and 7 is generated and the problem represented by Equation 8 is solved. Based on the estimated attack, the clock bias and clock drift are cleaned (i.e., corrected) using Equation 10. This process is repeated for a sliding observation window and only the clock bias and drift of the time instants that have not been cleaned previously are corrected. In another words, there is no duplication of modification over the states.

The mitigation algorithm represented by Equation 10 essentially solves a simple quadratic program with only few variables and can thus be performed in real time. For example, efficient implementations of quadratic programming solvers are readily available in low-level programming languages. Thus, the implementation of the TSARM solution in GPS receivers and electronic devices is straightforward and does not necessitate creating new libraries.

IV. NUMERICAL RESULTS

This section first describes a data collection device that was used to collect GPS measurement data during different TSA attacks and then assess three known or proposed detection schemes that fail to detect the TSA attacks. These attacks mislead the clock bias and clock drift, while maintaining correct location and velocity estimates. Finally, the performance of the TSARM solution in detecting, estimating and mitigating these attacks is demonstrated.

A. GPS Data Collection Device

A set of real GPS signals was recorded with a Google Nexus 9 Tablet at the University of Texas at San Antonio on Jun. 1, 2017. The ground truth of the position is obtained through taking the median of the WLS position estimates for a stationary device. This device has been recently equipped with a GPS chipset that provides raw GPS measurements. An android application, called GNSS Logger, has been released along with the post-processing MATLAB codes by the Google Android location team.

Of interest here are the two classes of the Android.location package. The GnssClock provides the GPS receiver clock properties and the GnssMeasurement provides the measurements from the GPS signals both with sub-nanosecond accuracies. To obtain the pseudorange measurements, the transmission time is subtracted from the time of reception. The function getReceivedSvTimeNanos( ) provides the transmission time of the signal which is with respect to the current GPS week (Saturday-Sunday midnight). The signal reception time is available using the function getTimeNanos( ). To translate the receiver's time to the GPS time (and GPS time of week), the package provides the difference between the device clock time and GPS time through the function getFullBiasNanos( ).

The receiver clock's covariance matrix, $Q_t$, is dependent on the statistics of the device clock oscillator. The following model is typically adopted:

$$Q_t = \begin{pmatrix} c^2\sigma_b^2 \Delta t + c^2 \sigma_{\dot{b}}^2 \frac{\Delta t^3}{3} & c^2 \sigma_{\dot{b}}^2 \frac{\Delta t^2}{2} \\ c^2 \sigma_{\dot{b}}^2 \frac{\Delta t^2}{2} & c^2 \sigma_{\dot{b}}^2 \Delta t \end{pmatrix} \quad (11)$$

where $$\sigma_b^2 = \frac{h_0}{2} \text{ and } \sigma_{\dot{b}}^2 = 2\pi^2 h_{-2};$$

and we select $h_0=8\times 10^{-19}$ and $h_{-2}=2\times 10^{-20}$. For calculating the measurement covariance matrix, $R_t$, the uncertainty of the pseudorange and pseudorange rates are used. These uncertainties are available from the device together with the respective measurements. In the experiments, we set $\lambda=5\times 10^{-10}$, because the distance magnitudes are in tens of thousands of meters. The estimated clock bias and drift through EKF in normal operation is considered as the ground truth for the subsequent analysis. In what follows, reported times are local.

B. Failure of Prior Art Algorithms in Detecting Consistent Attacks

This section demonstrates that three known approaches that may fail to detect consistent attacks, that is, attacks where $s_p$ is the integral of $s_{\dot{p}}$ in Equation 4.

The performances of the EKF and of an anti-spoofing particle filter subject when subjected to a Type II attack will be discussed first. The particle filter is described in an article by S. Han, D. Luo, W. Meng, and C. Li, entitled "A novel anti-spoofing method based on particle filter for GNSS," published in *Proc. IEEE Int. Conf. Commun.*, June 2014, pp. 5413-5418.

Figure 4A:
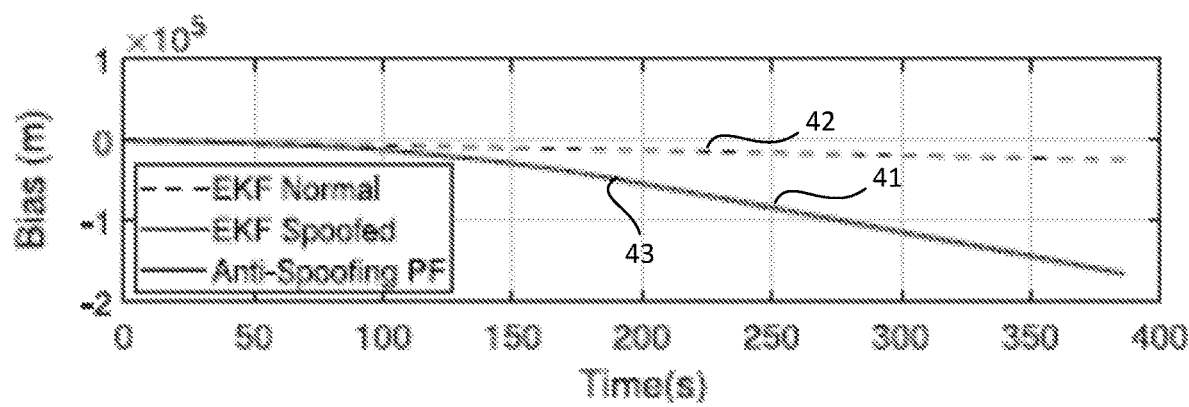
FIGS. 4A and 4B graphically illustrate the clock bias and drift, respectively, and depict the effect of a TSA on the clock bias and drift, respectively, when using the known EKF and particle filter approaches.
Figure 4B:
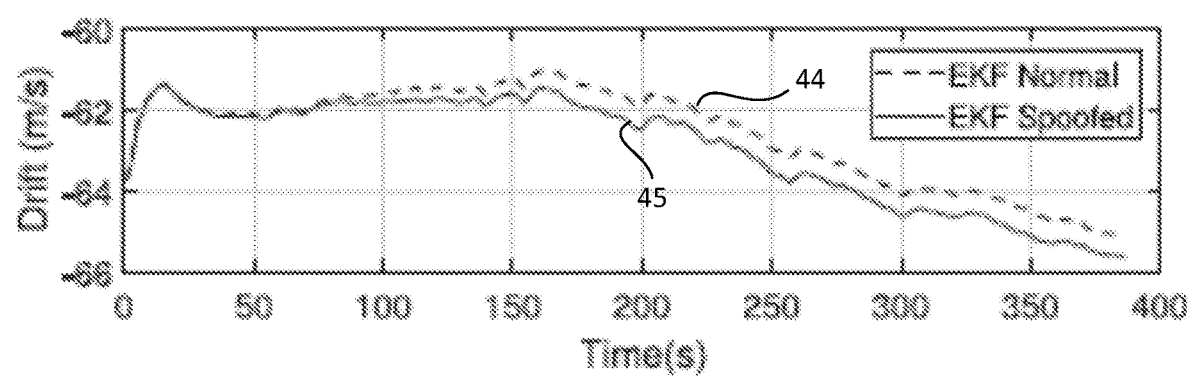

The perturbations over GPS measurements are the same as described above with reference to FIGS. 2A and 2B and are used as input to the EKF and to the particle filter. The attack starts at t=30 s. FIGS. 4A and 4B graphically illustrate the clock bias and drift, respectively, and depict the effect of attack on the clock bias and drift, respectively, for EKF and for a particle filter. The EKF on the dynamical model expressed in Equations 6 and 7 blindly follows the attack after a short settling time, as indicated by curve 41, which corresponds to EKF spoofed by the Type II spoofing attack. Curve 42 corresponds to the normal EKF results in the absence of a spoofing attack. The anti-spoofing particle filter only estimates the clock bias and assumes the clock drift is known from WLS. Similarly to the EKF, the particle filter is not able to detect the consistent spoofing attack. Curve 43, which is nearly identical to curve 41, represents the clock bias results obtained using the particle filter. In FIG. 4B, curves 45 and 46 correspond to the normal and spoofed EKF, respectively, for clock drift, which indicates that EKF was generally unsuccessful at detecting the Type II attack. The maximum difference between the receiver estimated position obtained from the EKF on Equation 3 under a Type II attack and under normal operation is $x_{diff}=67$ m, $y_{diff}=112$ m, and $z_{diff}=71$ m. Thus, the position estimate has not been considerably altered by the attack.

The third known approach to be evaluated was proposed in an article by F. Zhu, A. Youssef, and W. Hamouda, entitled "Detection techniques for data-level spoofing in GPS-based phasor measurement units," published in *Proc. 2016 Int. Conf. Sel. Topics Mobile Wireless Netw.*, April 2016, pp. 1-8. This approach monitors the statistics of the receiver clock as a typical spoofing detection technique. Considering that off-the-shelf GPS receivers compute the bias at regular $\Delta t$ intervals, this particular approach estimates the GPS time after k time epochs, and confirms that the time elapsed is indeed $k\Delta t$. To this end, the following statistic can be formulated:

$$\mathcal{D}(k) = \left[ t_R^{GPS}(k) - t_R^{GPS}(1) - (k-1)\Delta t - \sum_{k'=1}^{k} \hat{b}[k']\Delta t \right] c.$$

The test statistic D is normally distributed with mean zero when there is no attack and may have nonzero mean depending on the attack, as will be demonstrated shortly. Its variance needs to be estimated from a few samples under normal operation. The detection procedure relies on statistical hypothesis testing. For this, a false alarm probability, $P_{FA}$, is defined. Each $P_{FA}$ corresponds to a threshold $\gamma$ to which D(k) is compared against. If a determination is made that $|\mathcal{D}(k)| \geq \gamma$, then the receiver is considered to be under attack.

Figure 5A:
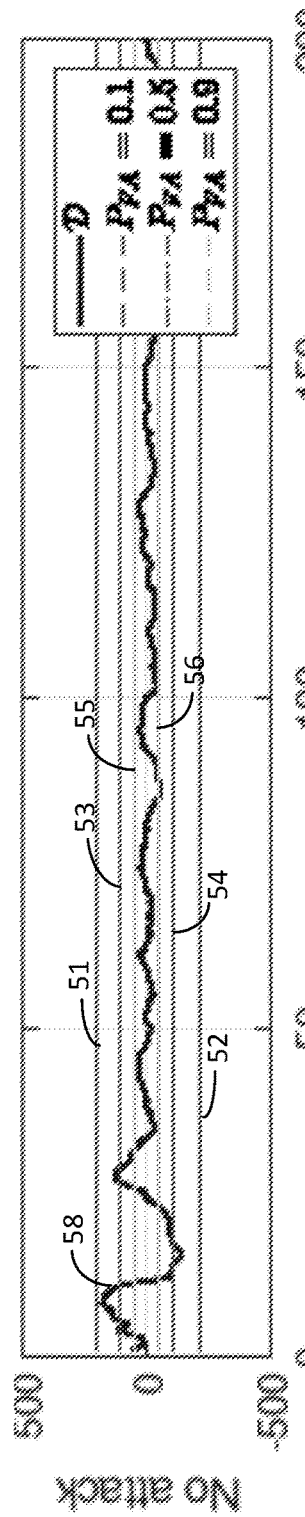
FIGS. 5A-5C graphically illustrate the results of using a known statistical monitoring method to detect a Type I TSA.
Figure 5B:
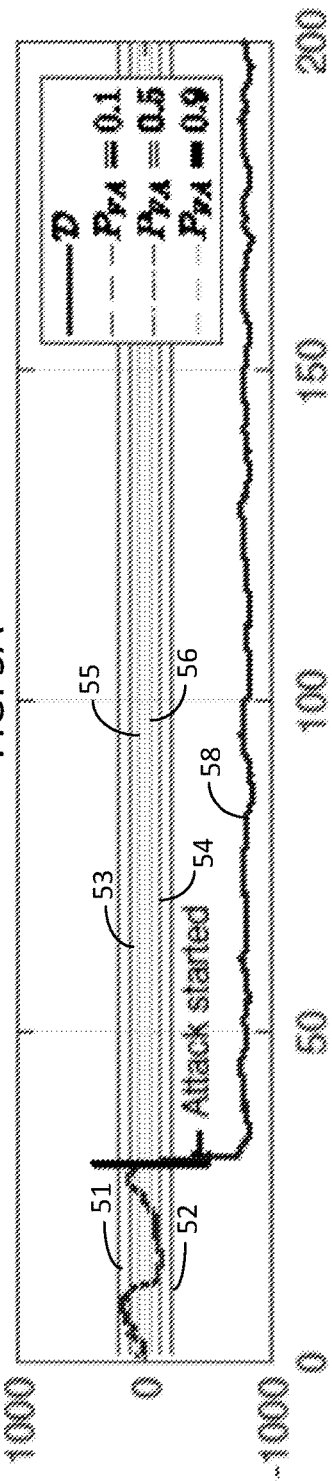
Figure 5C:
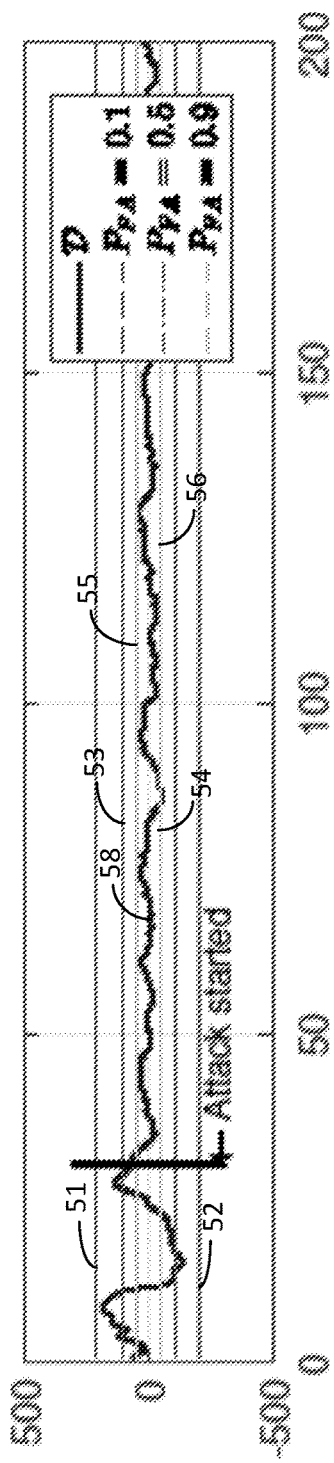

The result of this statistical monitoring method is shown in FIGS. 5A-5C for different false alarm probabilities, $P_{FA}=0.1$, $P_{FA}=0.5$ and $P_{FA}=0.9$. In FIGS. 5A-5C, lines 51 and 52 correspond to $P_{FA}=0.1$, lines 53 and 54 correspond to $P_{FA}=0.5$ and lines 55 and 56 correspond to $P_{FA}=0.5$. In FIGS. 5A-5C, time signature 58 corresponds to D(k). FIG. 5A depicts the time signature D(k) 58 when the system is not under attack. The time signature 58 lies between the thresholds 51 and 52 only for low false alarm probabilities, $P_{FA}=0.1$. The system can detect the attack in case of an inconsistent Type I attack, in which $s_p$ is not the integration of perturbations over pseudorange rates, $s_{\dot{p}}$, and only pseudoranges are attacked. FIG. 5B shows that the attack is detected right away, as the time signature 58 does not lie between any of the thresholds. However, for smart attacks, where the spoofer maintains the consistency between the pseudorange and pseudorange rates, FIG. 5C illustrates that the time signature D(k) 58 fails to detect the attack. This example shows that the statistical behavior of the clock can remain untouched under smart spoofing attacks. In addition, even if an attack is detected, the known methods cannot provide an estimate of the attack. In contrast, the TSARM solution of the present disclosure not only is capable of detecting such attacks, but also estimates the effect of the attacks and then uses the estimates to mitigate, or correct, the effect of the attack, as will now be described with reference to FIGS. 6A-10.

C. Spoofing Detection on Type I Attack

FIGS. 6A-6D graphically illustrate the result of solving Equation 8 using GPS measurements perturbed by the Type I attack described above with reference to FIGS. 1A and 1B. FIG. 1A shows the normal clock bias 61 and the spoofed bias 62. FIG. 6B shows the total variation 63 of the estimated bias attack $\hat{s}_b$. FIG. 6C shows the total variation 64 of the estimated drift, attack $\hat{s}_b$. FIG. 6D shows the true bias 64 and the modified, or corrected, bias 65. The fact that the true bias 64 and the corrected bias 65 shown in FIG. 6D are identical, or nearly identical, is indicative of the effectiveness of the TSARM solution of the present disclosure. The spoofer has the ability to attack the signal in a very short period of time so that the clock bias experiences a jump at t=30 s. The estimated total variation 63 of the bias attack renders a spike at the attack time. The mitigation procedure of Equation 10 corrects the clock bias using the estimated attack to obtain the results shown in FIG. 6D.

D. Spoofing Detection on Type II Attack

Figure 7A:
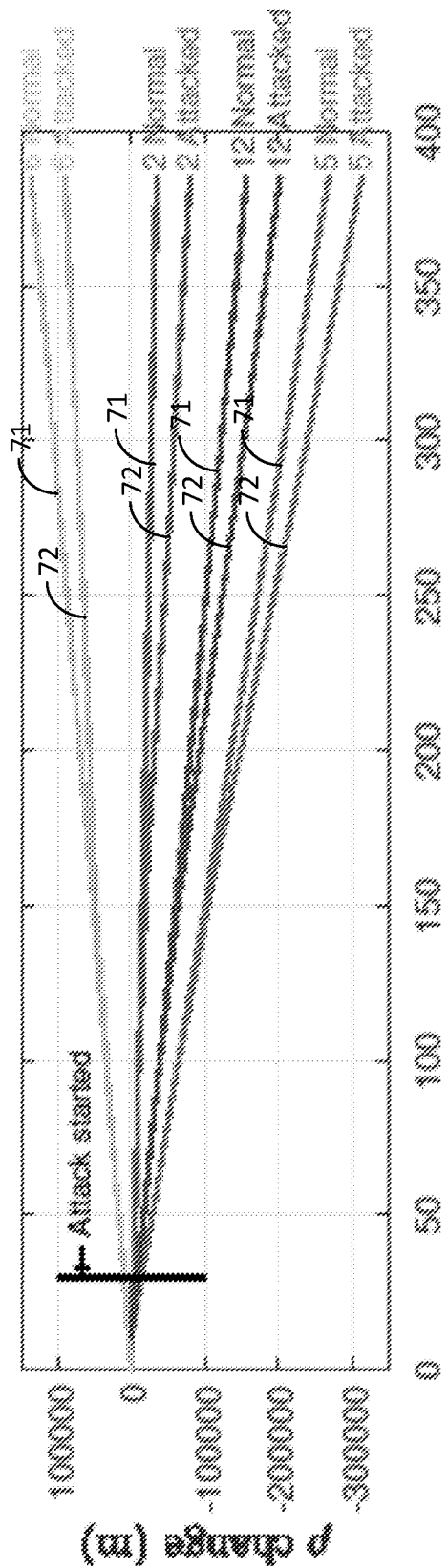
FIGS. 7A and 7B graphically illustrate normal and spoofed pseudorange change pseudorange rate, respectively, under a Type II attack for some of the visible satellites in the receiver's view.
Figure 7B:
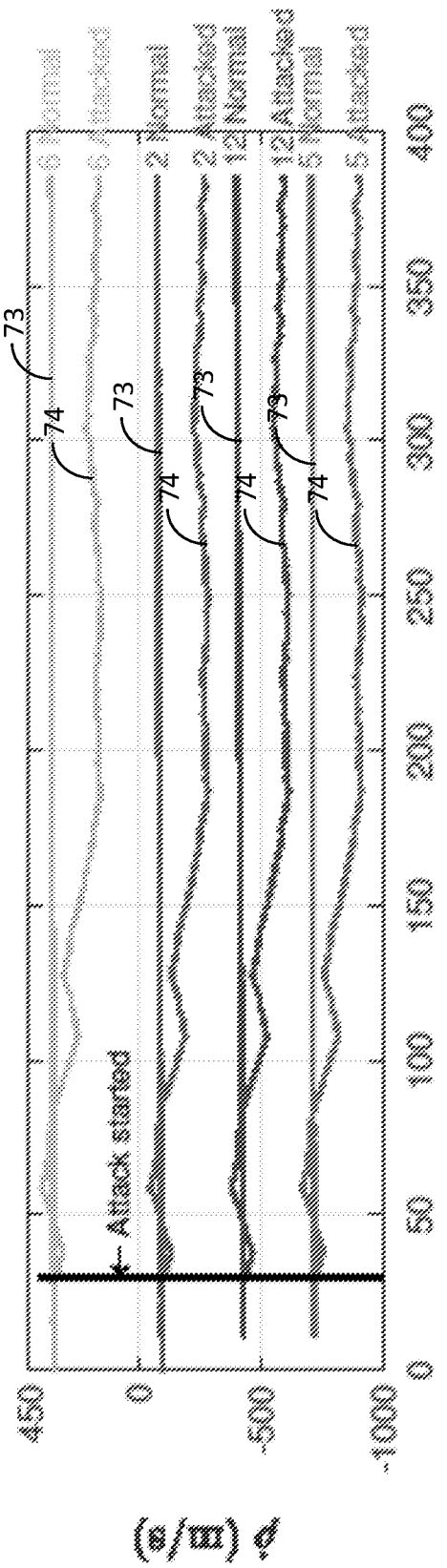

FIG. 7A graphically illustrates the normal pseudorange change 71 and the spoofed pseudorange change 72 under a Type II attack for some of the visible satellites in the receiver's view. FIG. 7B graphically illustrates the normal pseudorange rate 73 and the spoofed pseudorange rate 74 under the Type II attack for some of the visible satellites in the receiver's view. FIG. 7A illustrates the normal and spoofed pseudorange changes with respect to their initial value at t=0 s for some of the visible satellites in the receiver's view. The tag at the end of each line 71-74 indicates the satellite ID and whether the pseudorange (or pseudorange rate) corresponds to normal operation or operation under attack. The spoofed pseudoranges diverge quadratically starting at t=30 s following the Type II attack.

For the Type II attack, Algorithm 1 (FIG. 3) is implemented for a sliding observation window with L=50 s with $T_{lag}$=10 s. FIGS. 8A-8D graphically illustrate the results obtained by performing Algorithm 1 for t=1 s to t=50 s. FIG. 8A shows the normal bias 81 and the spoofed bias 82 before and after the attack. FIG. 8B shows the estimated bias attack 83 obtained by the portion of Algorithm 1 corresponding to Equation 8. FIG. 8C shows the total variation 84 of the estimated bias attack. FIG. 8D shows the true bias 85 and the modified, i.e., the corrected, bias 86. The attacked clock bias starts at t=30 s. Since the attack magnitude is small at initial times of the spoofing, neither the estimated attack $\hat{s}_b$ 83 nor the total variation 84 show significant values.

The purpose of using the sliding observation window is to correct the current clock bias and clock drift for all the times that have not been corrected previously. Hence, at the first run the estimates of the whole window are modified. FIGS. 9A-9D graphically illustrate the results obtained by performing Algorithm 1 for t=11 s to t=60 s. FIG. 9A shows the normal bias 91 and the spoofed bias 92 before and after the attack. FIG. 8B shows the estimated bias attack 93 obtained by the portion of Algorithm 1 corresponding to Equation 8.

FIG. 9C shows the total variation 94 of the estimated bias attack. FIG. 9D shows the true bias 95 and the modified, i.e., the corrected, bias 96. As is obvious from FIGS. 9A-9D, the modification of the previous clock biases transforms the low dynamic behavior of the spoofer to a large jump at t=50 s, which facilitates the detection of the attack through the total variation component in Equation 8. The clock bias and drift have been modified for the previous time instants and need to be cleaned only for t=50 s to t=60 s.

E. Analysis of the Results

Let K be the total length of the observation time (in this experiment, K=386). The root mean square error (RMSE) is introduced:

$$\text{RMSE} = \frac{c}{K}\sqrt{\sum_{k=0}^{K-1}(\tilde{b}_u[k]-\bar{b}_u[k])^2},$$

which shows the average error between the clock bias that is output from the spoofing detection technique, $\tilde{b}_u$, and the estimated clock bias from EKF under the normal operation, $\bar{b}_u$, which is considered as the ground truth. Comparing the results of the estimated spoofed bias from the EKF and the normal bias shows that $\text{RMSE}_{EKF}$=3882 m. This error for the anti-spoofing particle filter is $\text{RMSE}_{PF}$=3785 m. Having applied the TSARM solution of the present disclosure, the clock bias has been corrected with a maximum error of $\text{RMSE}_{TSARM}$=258 m, which is better than a 10× improvement over the known EKF and particle filter approaches.

Figure 10:
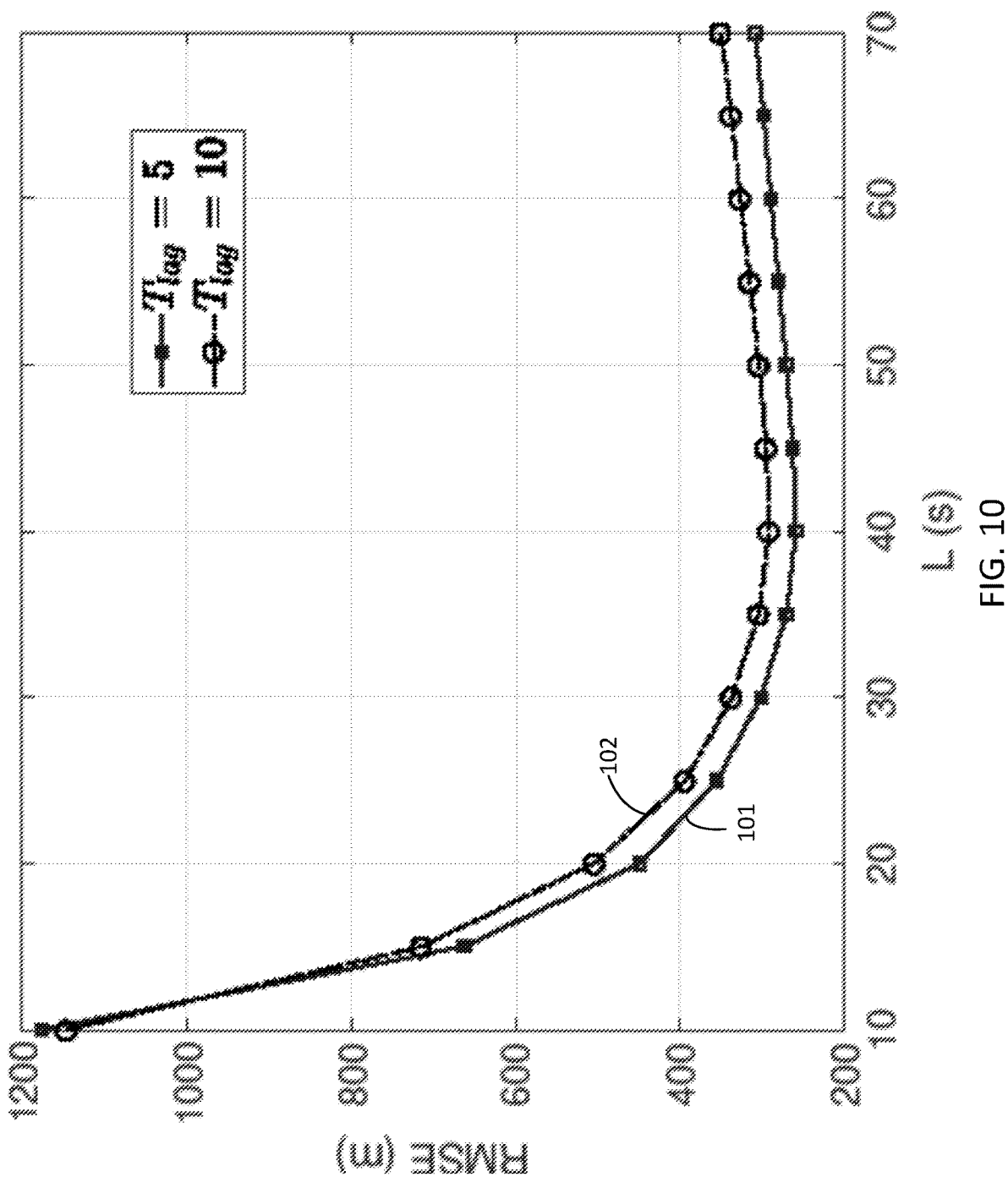
FIG. 10 graphically illustrates the root mean square error (RABE) of the TSARM solution for a range of values for the observation window size L and the lag time $T_{lag}$.

FIG. 10 graphically illustrates the RMSE of the TSARM solution for a range of values for the observation window size L and the lag time $T_{lag}$. Curve 101 corresponds to a lag time $T_{lag}$=5 s and curve 102 corresponds to a lag time $T_{lag}$=10 s. When the observation window is smaller, fewer measurements are used for state estimation. On the other hand, when L exceeds 40 s, the number of states to be estimated grows although more measurements are employed for estimation. The numerical results demonstrate that Equation 6 models the clock bias and drift attacks effectively, which are subsequently estimated using Equation 8 and corrected using Equation 10.

Figure 11:
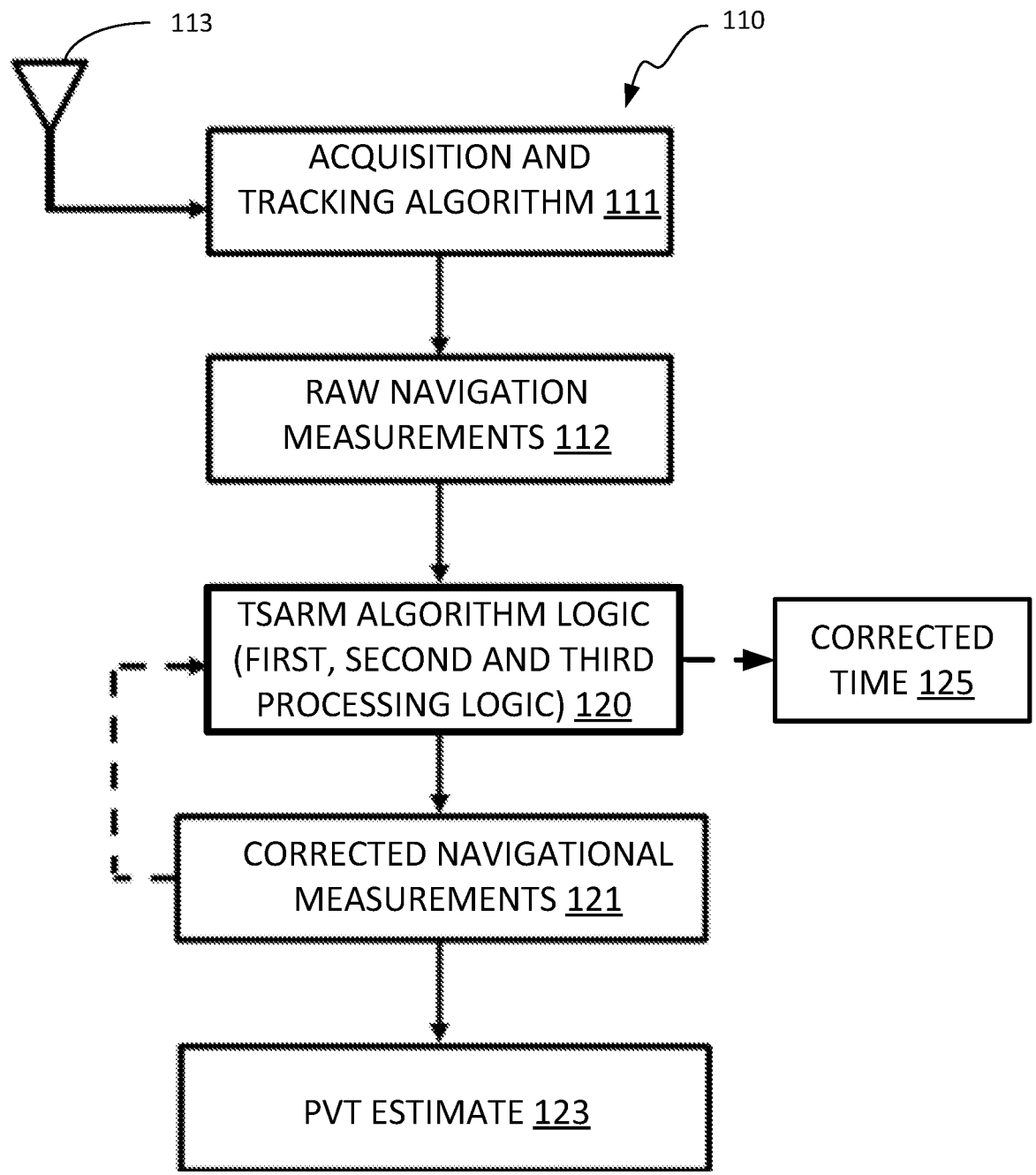
FIG. 11 illustrates a block diagram of the system of the TSARM solution in accordance with a representative embodiment interconnected with a GPS receiver circuit.

FIG. 11 illustrates a block diagram of the system 110 of the TSARM solution in accordance with a representative embodiment integrated into a GPS receiver circuit. The method of the TSARM solution comprises an algorithm that can run on a processor, as that term is defined herein. The processor that runs the TSARM algorithm preferably is inside of the GPS receiver. GPS receivers typically have such a processor configured to run a standard algorithm that computes the PVT solution. Instead of running the standard algorithm to compute the PVT solution, the processor can be configured to run the TSARM algorithm. If the processor of the GPS receiver has sufficient computational power, e.g., if it is a multi-core processor, then the TSARM algorithm as well as the standard algorithm can be run in parallel. This TSARM solution adds functionality to the receiver such that the GPS receiver can do what it already does in the standard operation, but also can detect and correct attacks, if they occur. Thus, the TSARM solution can be implemented more easily than other solutions in the literature in that other solutions must change other operations of the GPS receiver, and not simply the algorithm that computes the PVT solution.

With reference to FIG. 11, blocks 111 and 112 correspond to components that are typically found in GPS receivers for estimating PVT. In accordance with a representative embodiment, the TSARM system 110 is formed by adding blocks 120 and 121 corresponding to the operations described above with reference to Equations 6-10 to detect and estimate an effect of a TSA and to mitigate the effect of the TSA. The PVT estimate 123 that is output from the system 110 has been corrected to remove the effect of any TSA. Block 111 performs acquisition and tracking based on signals received by the antenna 113 of the GPS receiver to obtain raw navigation measurements. In existing GPS receivers, the raw navigation measurements are typically processed to produce the PVT estimate. However, in accordance with this representative embodiment, the raw navigation measurements are the input to the TSARM algorithm logic 120 and used in Equations 6-10 to perform the operations described above. Thus, the effect of the TSA has been removed such that the PVT estimate 123 is free of the effect of any TSA. The corrected time 125 may also be output directly from the TSARM algorithm logic 120. This output corresponds to the output in line 11 of the algorithm shown in FIG. 3.

Figure 12A:
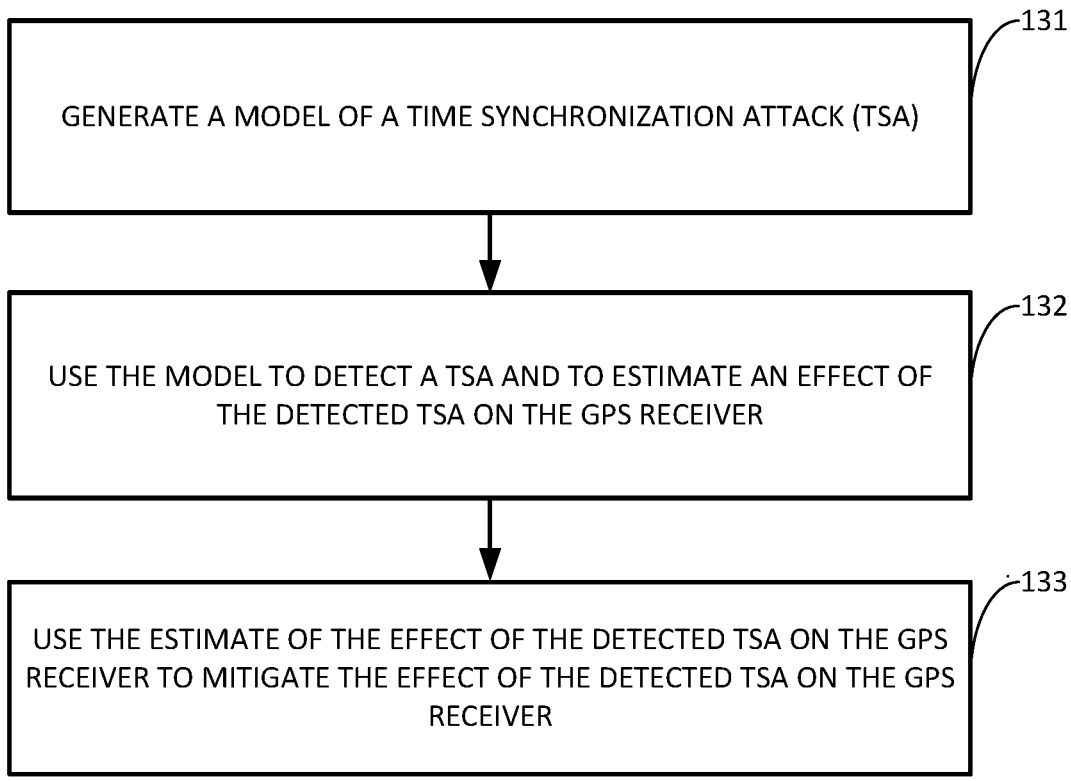
FIG. 12A illustrates a flow diagram that represents the method of the TSARM solution in accordance with a representative embodiment.

FIG. 12A illustrates a flow diagram that represents the method of the TSARM solution in accordance with a representative embodiment. A model of a TSA on a GPS receiver is generated, as indicated by block 131. In accordance with an embodiment, the process of generating the model is performed in first logic of the system 110 shown in FIG. 11 that is implemented in block 120, although the model could be generated by any suitable logic located at any suitable location. The model is used to detect a TSA and to estimate an effect of the detected TSA on the GPS receiver, as indicated by block 132. In accordance with an embodiment, the process of using the mdoel to detect a TSA and to estimate the effect of the detected TSA on the GPS receiver is performed in second logic of the system 110 shown in FIG. 11 that is implemented in block 120, although this process could be performed by an suitable logic located at any suitable location. The estimate of the effect of the detected TSA on the GPS receiver is then used to mitigate the effect of the detected TSA on the GPS receiver, as indicated by block 133. In accordance with an embodiment, the process of using the estimate of the effect of the detected TSA on the GPS receiver to mitigate the effect is performed in third logic of the system 110 shown in FIG. 11 that is implemented in block 120, although this process could be performed by any suitable logic located at any suitable location.

Figure 12B:
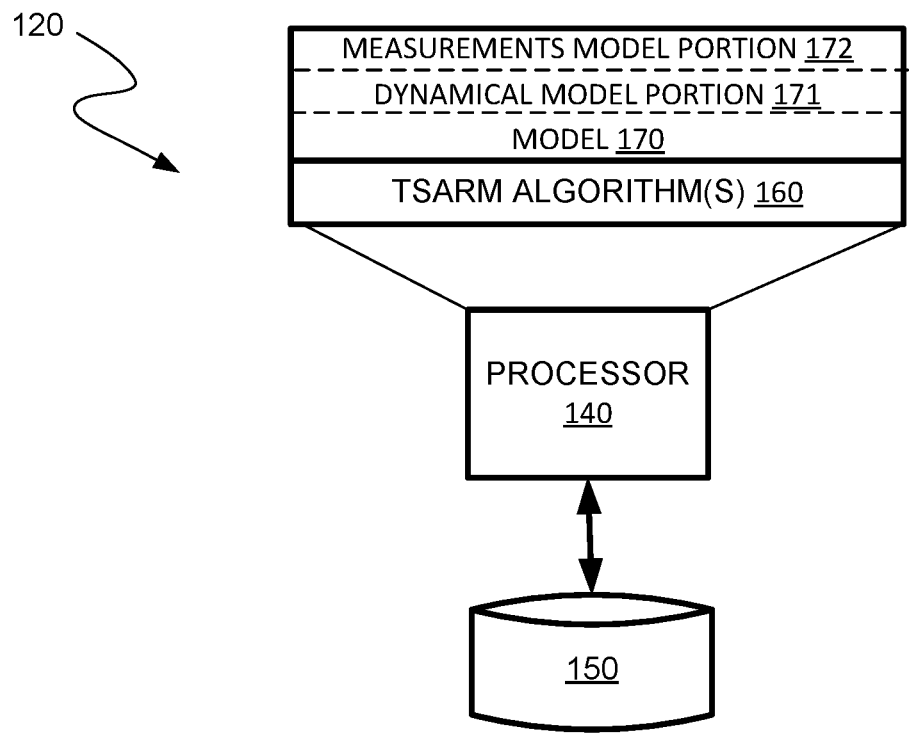
FIG. 12B illustrates a block diagram of the TSA algorithm logic 120 shown in FIG. 11 for performing the method depicted in the flow diagram of FIG. 12A in accordance with a representative embodiment.

FIG. 12B illustrates a block diagram of the TSA algorithm logic 120 in accordance with a representative embodiment. If the method represented by the flow diagram of FIG. 12 is performed in software and/or firmware, the corresponding computer instructions will be stored in some suitable non-transitory computer-readable medium 150, such as a solid state, optical or magnetic memory device. Suitable solid state memory devices include, for example, random access memory (RAM) devices, read-only memory (ROM) devices, flash memory devices (e.g., flash ROM), erasable programmable read-only memory devices (EPROM), etc. Such a memory device may be located, for example, inside of block 120 shown in FIG. 11. A processor 140 can comprise the first, second and third TSARM processing logic configured to perform the TSARM algorithm. The first, second and third processing logic of the processor 140 perform the TSARM algorithm 160 using the aforementioned model 170, which includes the aforementioned dynamical model portion 171 and the measurements model portion 172.

V. CONCLUDING REMARKS AND FUTURE WORK

The TSARM solution is effective at detecting and estimating TSAs on GPS receivers and of using the estimates to mitigate the effects of the TSAs. Two principal types of attacks were discussed above and a dynamical model that specifically models these attacks was described herein. The TSA detection algorithm of the TSARM solution preferably solves an optimization problem to estimate the TSAs on the clock bias and clock drift. The spoofer manipulated clock bias and drift are corrected using the estimated TSAs. The method of the TSARM solution detects the behavior of the spoofer even if the integrity of the measurements is preserved. The numerical results demonstrate that the TSA can be largely rejected, and the bias can be estimated within 0:86 µs of its true value, which lies well within the standardized accuracy in PMU and CDMA applications. In addition, the method of the TSARM solution can be implemented for real-time operation.

To demonstrate some of the inventive principles and concepts, a set of GPS signals was obtained from an actual GPS receiver in a real environment, and TSAs were simulated based on the characteristics of real spoofers reported in the literature. The TSARM solution was shown to be highly effective at detecting and estimating the TSA and then using the estimate to correct or mitigate the effect of the TSA.

It should be noted that the illustrative embodiments have been described with reference to a few embodiments for the purpose of demonstrating the principles and concepts of the invention. Persons of skill in the art will understand how the principles and concepts of the invention can be applied to other embodiments not explicitly described herein. For example, while particular system arrangements are described herein and shown in the figures, a variety of other system configurations may be used. As will be understood by those skilled in the art in view of the description provided herein, many modifications may be made to the embodiments described herein while still achieving the goals of the invention, and all such modifications are within the scope of the invention.

What is claimed is:

1. A method for detecting and mitigating a time synchronization attack (TSA) on a Global Positioning System (GPS) receiver, the method comprising:
   generating a model of a TSA on a GPS receiver;
   using the model to detect a TSA and to estimate an effect of the detected TSA on the GPS receiver; and
   using the estimate of the effect of the detected TSA on the GPS receiver to mitigate the effect of the detected TSA on the GPS receiver.

2. The method of claim 1, wherein the use of the model to detect the TSA and to estimate an effect of the detected TSA is based at least in part on a multi-objective optimization of at least two objective functions.

3. The method of claim 2, wherein each objective function depends on at least a measurement taken by the GPS receiver, a position of the GPS receiver, a velocity of the GPS receiver, a clock bias of the GPS receiver, a clock drift of the GPS receiver, a position of at least one satellite, a velocity of said at least one satellite, a clock bias of said at least one satellite, a clock drift of said at least one satellite, and at least one spoofing perturbation comprising said effect of the detected TSA on the GPS receiver.

4. The method of claim 2, wherein the objective functions are parametrized.

5. The method of claim 2, wherein the multi-objective optimization is solvable by at least one of an optimal algorithm and a suboptimal algorithm.

6. The method of claim 1, wherein the model includes a dynamical model portion that models a clock bias and a clock drift of the GPS receiver at a current time, according at least to the clock bias and the clock drift of the GPS receiver at an earlier time and spoofing perturbations on the clock bias and the clock drift at the earlier time.

7. The method of claim 6, wherein the model further includes a measurements model portion that models at least a pseudorange and a pseudorange rate of the GPS receiver relative to N satellites according at least to the position, velocity, clock bias, and clock drift of the N satellites and the position, velocity, the clock bias, and clock drift of the GPS receiver, where N is a positive integer.

8. The method of claim 7, wherein the step of using the model to detect the TSA and to estimate the effect of the detected TSA on the GPS receiver comprises generating the model over a first observation window of length L to form a first optimization problem and solving the first optimization problem to obtain a first set of estimates of spoofing perturbations on the clock bias and the clock drift of the GPS receiver over the first observation window.

9. The method of claim 8, wherein the step of using the estimate of the effect of the detected TSA on the GPS receiver to mitigate the effect of the detected TSA on the GPS receiver comprises:
using the first set of estimates of the spoofing perturbations on the clock bias and clock drift to calculate a first cumulative effect of the spoofing perturbations on the clock bias and clock drift over the first observation window; and
compensating the clock bias and clock drift at the current time according to the first cumulative effect.

10. The method of claim 9, wherein the method is performed in real time by logic of the GPS receiver such that normal operations of the GPS receiver need not be halted.

11. The method of claim 10, wherein the first optimization problem is a quadratic problem.

12. The method of claim 9, further comprising, after compensating the clock bias and clock drift at the current time according to the first cumulative effect:
sliding the first observation window to produce a second observation window of length L that partially overlaps the first observation window;
generating the model over the second observation window to form a second optimization problem;
solving the second optimization problem to obtain a second set of estimates of the spoofing perturbations on the clock bias and the clock drift of the GPS receiver over the second observation window;
using the second set of estimates of the spoofing perturbations on the clock bias and clock drift to calculate a second cumulative effect of the spoofing perturbations on the clock bias and clock drift over the second observation window; and
compensating the clock bias and clock drift at a later time according to the second cumulative effect.

13. The method of claim 1, further comprising:
outputting an indication that the detected TSA has been detected.

14. A system for detecting and mitigating a time synchronization attack (TSA) on a Global Positioning System (GPS) receiver, the system comprising:
first processing logic configured to generate a model of a TSA on a GPS receiver;
second processing logic configured to perform an estimation algorithm that uses the model to detect a TSA and to estimate an effect of the detected TSA on the GPS receiver; and
third processing logic configured to perform a mitigation algorithm that uses the estimate of the effect of the detected TSA on the GPS receiver to mitigate the effect of the detected TSA on the GPS receiver.

15. The system of claim 14, wherein the estimation algorithm performs a multi-objective optimization of at least two objective functions.

16. The system of claim 15, wherein each objective function depends on at least a measurement taken by the GPS receiver, a position of the GPS receiver, a velocity of the GPS receiver, a clock bias of the GPS receiver, a clock drift of the GPS receiver, a position of at least one satellite, a velocity of said at least one satellite, a clock bias of said at least one satellite, a clock drift of said at least one satellite, and at least one spoofing perturbation comprising said effect of the detected TSA on the GPS receiver.

17. The system of claim 15, wherein the objective functions are parametrized.

18. The system of claim 15, wherein the multi-objective optimization is solvable by at least one of an optimal algorithm and a suboptimal algorithm.

19. The system of claim 14, wherein the model includes a dynamical model portion that models a clock bias and a clock drift of the GPS receiver at a current time according at least to the clock bias and the clock drift of the GPS receiver at an earlier time and spoofing perturbations on the clock bias and the clock drift at the earlier time.

20. The system of claim 19, wherein the model further includes a measurements model portion that models at least a pseudorange and a pseudorange rate of the GPS receiver relative to N satellites according at least to a position, velocity, clock bias, and clock drift of the N satellites and a position, velocity, clock bias, and clock drift of the GPS receiver, where N is a positive integer.

21. The system of claim 20, wherein the estimation algorithm generates the model over a first observation window of length L to form a first optimization problem and solves the first optimization problem to obtain a first set of estimates of spoofing perturbations on the clock bias and the clock drift of the GPS receiver over the first observation window.

22. The system of claim 21, wherein tasks performed by the mitigation algorithm include:
using the first set of estimates of the spoofing perturbations on the clock bias and clock drift to calculate a first cumulative effect of the spoofing perturbations on the clock bias and clock drift over the first observation window; and
compensating the clock bias and clock drift at the current time according to the first cumulative effect.

23. The system of claim 22, wherein the system operates in real time to compensate the clock bias and clock drift in real time or near real time to avoid halting normal operations of the GPS receiver.

24. The system of claim 23, wherein the first optimization problem is a quadratic problem.

25. The system of claim 22, wherein after compensating the clock bias and clock drift at the current time according to the first cumulative effect, the second processing logic is configured to slide the first observation window to produce a second observation window of length L that partially overlaps the first observation window, the first processing logic being configured to generate the model over the second observation window to form a second optimization problem and to solve the second optimization problem to obtain a second set of estimates of the spoofing perturbations on the clock bias and the clock drift of the GPS receiver over the second observation window, the third processing logic being configured to use the second set of estimates of the spoofing perturbations on the clock bias and clock drift to calculate a second cumulative effect of the spoofing perturbations on the clock bias and clock drift over the second observation window and to compensate the clock bias and clock drift at a later time according to the second cumulative effect.

26. A computer program embodied on a non-transitory computer-readable medium, the computer program comprising computer instructions for execution by a processor, the computer instructions comprising:

a first code segment that generates a model of a TSA on a GPS receiver;

a second code segment that uses the model to detect a TSA and to estimate an effect of the detected TSA on the GPS receiver; and a third code segment that uses the estimate of the effect of the detected TSA on the GPS receiver to mitigate the effect of the detected TSA on the GPS receiver.

* * * * *